US007243054B2

(12) United States Patent
Rappaport et al.

(10) Patent No.: US 7,243,054 B2
(45) Date of Patent: *Jul. 10, 2007

(54) METHOD AND SYSTEM FOR DISPLAYING NETWORK PERFORMANCE, COST, MAINTENANCE, AND INFRASTRUCTURE WIRING DIAGRAM

(75) Inventors: Theodore S. Rappaport, Austin, TX (US); Roger R. Skidmore, Austin, TX (US)

(73) Assignee: Wireless Valley Communications, Inc., Austin, TX (US)

( * ) Notice: Subject to any disclaimer, the term of this patent is extended or adjusted under 35 U.S.C. 154(b) by 875 days.

This patent is subject to a terminal disclaimer.

(21) Appl. No.: 10/386,939

(22) Filed: Mar. 13, 2003

(65) Prior Publication Data
US 2003/0229478 A1 Dec. 11, 2003

Related U.S. Application Data

(63) Continuation-in-part of application No. 10/244,409, filed on Sep. 17, 2002, which is a continuation of application No. 09/352,678, filed on Jul. 14, 1999, now Pat. No. 6,499,006.

(51) Int. Cl.
  *G06G 17/50* (2006.01)
  *G06F 3/00* (2006.01)
(52) U.S. Cl. .............. 703/2; 703/5; 703/18; 455/33.1; 455/33.4; 345/133
(58) Field of Classification Search .............. 703/2, 703/6, 20, 18, 5; 345/441, 133; 455/115.1, 455/33.1, 33.4, 67.1
See application file for complete search history.

(56) References Cited

U.S. PATENT DOCUMENTS

| | | | |
|---|---|---|---|
| 4,675,147 | A | 6/1987 | Schaefer et al. |
| 4,736,453 | A | 4/1988 | Schloemer |
| 4,885,694 | A | 12/1989 | Pray et al. |
| 5,111,392 | A | 5/1992 | Malin |
| 5,119,307 | A | 6/1992 | Blaha et al. |
| 5,239,487 | A | 8/1993 | Horejsi et al. |
| 5,293,640 | A | 3/1994 | Gunmar et al. |
| 5,307,261 | A | 4/1994 | Maki et al. |
| 5,337,149 | A | 8/1994 | Kozah et al. |

(Continued)

OTHER PUBLICATIONS

From Bird's Eye Real-time Mapping Software dated Jun. 30, 2002.

(Continued)

*Primary Examiner*—Thai Phan

(57) ABSTRACT

A network which includes electromagnetic components, such as a wireless communications system, is designed, optimized, modified and/or saved or exported to another applications program using a graphical interface. A display may present a graphical rendering of performance characteristics in a site specific manner showing elements such as walls, doors, windows, furniture, people, foliage, and terrain. The locations where performance characteristic information are presented can be automatically selected and adjusted to present more or less information. The display can be viewed at multiple perspectives, and the viewing angle can be adjusted. In one embodiment, the display can graphically present information related to two different performance characteristics. An infrastructure wiring diagram can be generated for analysis or for exportation to other applications using the system, wherein after components are positioned and connected within the context of a site map, the site map itself is eliminated or significantly reduced in prominence.

258 Claims, 12 Drawing Sheets

U.S. PATENT DOCUMENTS

| | | | |
|---|---|---|---|
| 5,339,184 A | 8/1994 | Tang | |
| 5,375,123 A | 12/1994 | Andersson et al. | |
| 5,394,522 A | 2/1995 | Sanchez-Frank et al. | |
| 5,450,615 A | 9/1995 | Fortune et al. | |
| 5,458,123 A | 10/1995 | Unger | |
| 5,465,390 A | 11/1995 | Cohen | |
| 5,467,441 A | 11/1995 | Stone et al. | |
| 5,482,050 A | 1/1996 | Smokoff et al. | |
| 5,485,568 A | 1/1996 | Venable et al. | |
| 5,491,644 A | 2/1996 | Pickering et al. | |
| 5,491,837 A | 2/1996 | Haartsen | |
| 5,493,679 A | 2/1996 | Virgil et al. | |
| 5,515,269 A | 5/1996 | Willis et al. | |
| 5,528,518 A | 6/1996 | Bradshaw et al. | |
| 5,539,665 A | 7/1996 | Lamming et al. | |
| 5,553,312 A | 9/1996 | Gattey et al. | |
| 5,553,620 A | 9/1996 | Snider et al. | |
| 5,555,354 A | 9/1996 | Strasnick et al. | |
| 5,561,841 A | 10/1996 | Markus | |
| 5,564,070 A | 10/1996 | Want et al. | |
| 5,586,254 A | 12/1996 | Kondo | |
| 5,594,946 A | 1/1997 | Menich et al. | |
| 5,598,532 A | 1/1997 | Liron | |
| 5,608,854 A * | 3/1997 | Labedz et al. | 345/441 |
| 5,625,827 A | 4/1997 | Krause et al. | |
| 5,636,344 A | 6/1997 | Lewis | |
| 5,689,355 A | 11/1997 | Okubo et al. | |
| 5,710,758 A | 1/1998 | Soliman et al. | |
| 5,755,072 A | 5/1998 | Lingafelter | |
| 5,761,093 A | 6/1998 | Urbish et al. | |
| 5,774,669 A | 6/1998 | George et al. | |
| 5,794,128 A | 8/1998 | Brockel et al. | |
| 5,799,154 A | 8/1998 | Kuriyan | |
| 5,802,146 A | 9/1998 | Dulman | |
| 5,809,282 A | 9/1998 | Cooper et al. | |
| 5,815,395 A | 9/1998 | Hart et al. | |
| 5,821,937 A | 10/1998 | Tonelli et al. | |
| 5,825,759 A | 10/1998 | Liu | |
| 5,828,960 A | 10/1998 | Tang et al. | |
| 5,831,610 A | 11/1998 | Tonelli et al. | |
| 5,832,389 A | 11/1998 | Dent | |
| 5,845,124 A | 12/1998 | Berman | |
| 5,861,887 A | 1/1999 | Butler et al. | |
| 5,867,112 A | 2/1999 | Kost | |
| 5,877,777 A | 3/1999 | Colwell | |
| 5,878,328 A | 3/1999 | Chawla et al. | |
| 5,907,850 A | 5/1999 | Krause et al. | |
| 5,917,808 A | 6/1999 | Kosbab | |
| 5,923,850 A | 7/1999 | Barroux | |
| 5,926,762 A | 7/1999 | Arpee et al. | |
| 5,940,196 A | 8/1999 | Piehler et al. | |
| 5,945,976 A | 8/1999 | Iwamura et al. | |
| 5,948,055 A | 9/1999 | Pulsipher et al. | |
| 5,949,335 A | 9/1999 | Maynard | |
| 5,949,988 A | 9/1999 | Feisullin et al. | |
| 5,953,669 A | 9/1999 | Stratis et al. | |
| 5,963,867 A | 10/1999 | Reynolds et al. | |
| 5,970,406 A | 10/1999 | Komara | |
| 5,977,851 A | 11/1999 | Stancil et al. | |
| 5,987,328 A | 11/1999 | Ephremides et al. | |
| 5,994,984 A | 11/1999 | Stancil et al. | |
| 6,006,021 A | 12/1999 | Tognazzini | |
| 6,018,625 A | 1/2000 | Hayball et al. | |
| 6,021,316 A | 2/2000 | Heiska et al. | |
| 6,032,105 A | 2/2000 | Lee et al. | |
| 6,038,547 A | 3/2000 | Casto | |
| 6,044,273 A | 3/2000 | Tekinay | |
| 6,058,102 A | 5/2000 | Drysdale et al. | |
| 6,058,262 A | 5/2000 | Kawas et al. | |
| 6,059,842 A | 5/2000 | Dumarot et al. | |
| 6,061,722 A | 5/2000 | Lipa et al. | |
| 6,075,541 A | 6/2000 | Maclinovsky | |
| 6,085,335 A | 7/2000 | Djoko et al. | |
| 6,088,522 A | 7/2000 | Lee et al. | |
| 6,104,699 A | 8/2000 | Holender et al. | |
| 6,108,309 A | 8/2000 | Cohoe et al. | |
| 6,111,857 A | 8/2000 | Soliman et al. | |
| 6,122,083 A | 9/2000 | Ohta et al. | |
| 6,148,010 A | 11/2000 | Sutton et al. | |
| 6,199,032 B1 | 3/2001 | Anderson | |
| 6,204,813 B1 | 3/2001 | Wadell et al. | |
| 6,208,833 B1 | 3/2001 | Preschutti et al. | |
| 6,229,540 B1 | 5/2001 | Tonelli et al. | |
| 6,243,772 B1 | 6/2001 | Ghori et al. | |
| 6,253,086 B1 | 6/2001 | Parantainen et al. | |
| 6,285,377 B1 | 9/2001 | Greenbaum et al. | |
| 6,289,203 B1 | 9/2001 | Smith et al. | |
| 6,311,144 B1 | 10/2001 | Abu El Ata | |
| 6,317,599 B1 | 11/2001 | Rappaport et al. | |
| 6,326,987 B2 | 12/2001 | Alexander | |
| 6,330,005 B1 | 12/2001 | Tonelli et al. | |
| 6,337,688 B1 | 1/2002 | Berstis | |
| 6,338,031 B1 | 1/2002 | Lee et al. | |
| 6,356,758 B1 | 3/2002 | Almeida et al. | |
| 6,393,432 B1 | 5/2002 | Flansburg et al. | |
| 6,408,312 B1 | 6/2002 | Forthman et al. | |
| 6,442,507 B1 | 8/2002 | Skidmore et al. | |
| 6,470,195 B1 | 10/2002 | Meyer | |
| 6,487,417 B1 | 11/2002 | Rossoni et al. | |
| 6,493,679 B1 | 12/2002 | Rappaport et al. | |
| 6,496,290 B1 | 12/2002 | Lee | |
| 6,499,006 B1 * | 12/2002 | Rappaport et al. | 703/20 |
| 6,505,045 B1 | 1/2003 | Hills et al. | |

OTHER PUBLICATIONS

IEEE Transactions on Antennas and propagation, vol. 46, No. 8, Aug. 1998. "Effect of Terrrain on Path Loss in Urban Environments for Wireless Applications" Leonard Piazzi and Henry L. Bertoni.

P. Bahl, V. Padmanabban, and A. Barachandran, "A Software System for Locating Mobile Users: Design, Evaluation, and Lessons," Microsoft Technical Report, Apr. 2000.

G. Durgin, T.S. Rappaport, H. Xu, Measurements and Models for Radio Path Loss and Penetration Loss in and Around Homes and Trees at 5.85 GHz, IEEE Transactions on Communications, vol. 46, No. 11, Nov. 1998.

C.M. Peter Ho et al., "Antenna Effects on Indoor Obstructed Wireless Channels and a Deterministic Image-Based Wide-Band Propagation Model for In-Building Personal Communications Systems," International Journal of Wireless Information Networks, vol. 1, No. 1, 1994.

S. Kim et al., "Radio Propagation Measurements and Predictions Using Three-dimensional Ray Tracing in Urban Environments at 908 MHZ and 1.9 GHz," IEEE Transactions on Vehicular Technology, vol. 48, No. 3, May 1999.

T.S., Rappaport et al., "Use of Topographic Maps with Building Information to Determine Antenna Placements and GPS Satellite Coverage for Radio Detection and Tracking in Urban Environments," MPRG Technical Report MPRG-TR-95-14, Virginia Tech, Sep. 1995.

R.K. Morrow, Jr. and T.S. Rappaport, "Getting In," Wireless Review Magazine, Mar. 2000.

Wireless Valley Communications, Inc., "SitePlanner 3.16 for Windows 95/98/NT User's Manual," Software User's Manual, pp. 5-148 to 5-156, 1999.

M. Panjwani et al., "Interactive Computation of Coverage Regions for Wireless Communication in Multifloored Indoor Environments," IEEE Journal on Selected Areas in Communications, vol. 14, No. 3, Apr. 1996.

L. Piazzi and H.L. Bertoni, "Achievable Acurracy of Site-Specific Path-Loss Predictions in Residential Environments" IEEE Transactions on Vehicular Technology, vol. 48, No. 3, May 1999.

T.S. Rappaport et al., "Wireless Communications: Past Events and a Future Perspective", IEEE Communications Magazine, May 2002.

T.S. Rappaport et al., "Radio Propagation Prediction Techniques and Computer-Aided Channeling Modeling for Embedded Wireless Microsystems," ARPA Annual Report, MPRG Technical Report MPRG-TR-94-12, Virginia Tech, Jul. 1994.

T.S., Rappaport et al., "Use of Topographic Maps with Building Information to Determine Antenna Placements for Radio Detection and Tracking in Urban Environments," MPRG Technical Report MPRG-TR-95-14, Virginia Tech, Nov. 1995.

D. Ullmo et al., "Wireless Propagation in Buildings: A Statistical Scattering Approach," IEEE Transactions on Vehicular Technology, vol. 48, No. 3, May 1999.

T.S. Rappapoprt, "wireless Communications: Principles and Practice" Second Edition, Prentice Hall, 2002.

T.S. Rappaport et al., "Use of Topographic Maps with Building Information to Determine AntennaPlacements and GPS Satellite Coverage for Radio Detection and Tracking in Urban Environments," MPRG Technical Report MPRG-TR-95-14, Virginia Tech, Sep. 1995.

T.S. Rappaport et al., "Indoor Path Loss Measurement for Homes and Apartments at 2.4 and 5.85 GHz," private report produced for Motorola, Dec. 16, 1997.

T.S. Rappaport, "Isolating Interference," Wireless Review Magazine, May 2000.

Slides for T.S. Rappaport and R. Skidmore, "Introduction to In-Building Wireless Systems," Infocast In-Building Wireless Solutions Conference and Exposition, Feb. 4, 2003.

S. Sandhu, M.P. Koushik, and T.S. Rappaport "Predicted Path Loss for Roslyn VA.First set of predictions for ORD Project on Site Specific Propagation Prediction." MPRG Technical Report MPRG-TR-94-20, Virginia Tech. Dec. 1994.

S. Sandhu, M.P. Koushik, and T.S. Rappaport, "Predicted Path Loss for Roslyn VA, First set of predictions for ORD Project on Site Specific Propagation Prediction." MPRG Technical Report MPRG-TR-94-20, Virginia Tech, Mar. 1995.

S. Seidel et al., "Site-Specific Propagation Prediction for Wireless In-Building Personal Communication Design." IEEE Transactions on Vehicular Technology, vol. 43, No. 4, Nov. 1994.

S. Shakkottai and T.S. Rappaport, "Research Challenges in Wireless Networks: A Technical Overview," Proceeding of the Fifth International Symposium on Wireles Personal Multimedia Communications, Honolulu, HI, Oct. 2002.

H. Sherali et al., "On the Optimal Location of Transmitters for Micro-cellular Radio Communication System Design," IEEE Journal on Selected Areas in Communications, vol. vol. 14, No. 3, pp. 662-673, May 1996.

R. Skidmorre et al., "A Comprehensive In-Building and Microcellular Wireless Communication System Design Tool" The Bradley Department of Electrical Engineering, MPRG-TR-97-13, Jun. 1997. Master's Thesis—unpublished by Virginia Tech for 2 years after submission.

R. Skidm re, et al., Russell Senate Office Building Propagation Study, Project Report for Joseph R. Loring & Associates; "Project Update," AoC Contract # Acbr96088, prepared for Office of the Architect of the Capital, Jan. 19, 1997.

R. Skidmore, et al., Russell Senate Office Building Propagation Study, Project Report for Joseph R. Loring & Associates; "Assessment and Study of the Proposed Enhancements of the Wireless Communications Environment of the Russell Senate Office Building (RSOB) and Associated Utility Tunnels," AoC Contract # Acbr96088, prepared for Office of the Architect of the Capitol, Feb. 20, 1997.

R. Torres et al., "CINDOOR: An Engineering Tool for Planning and Design of Wireless Systems in Enclosed Spaces," IEEE Antennas and Propagation Magazine, vol. 41, No. 4 Aug. 1999.

R. Skidmore et al., "Interactive Coverage Region and System Design Simulation for Wireless Communication Systems in Multi-Floored Indoor Environments: SMT Plus *tm*," IEEE ICUPC Proceedings, 1996.

T.S. Rappaport et al., "Radio Propagation Prediction Techniques and Computer-Aided CHannel Modeling for Embedded Wireless Microsystems," MPRG Tech. Report MPRG-TR-95-08, Virginia Tech, Jul. 1995.

Company Web Page "Actix" www.actix.com product name: E-NOS (now E-AMS).

Company Web Page Agilent www.agilent.com product name: OPAS32.

Company Web Page "Agilent" www.agilent.com product name: Wizard.

Company Web Page "Comarco" www.edx.com product name: SignalPro.

Company Web Page "ComOpt" www.comopt.com. product name: CellOpt AFP.

Company Web Page "Lucent" www.bell-labs.com product name: WiSE.

Company Web Page "Ericsson" www.ericsson.com product name: TEMS Lite.

Company Web Page "Ericsson" www.ericsson.com product name: TEMS.

Company Web Page "Marconi" www.marconi.com product name: PlaNET.

Company Web Page "Marconi" www.marconi.com product name: decibelPlanner.

Company Web Page "Schema"www.schema.com product name: Optimizer.

Company Web Page "ScoreBoard" www.scoreboard.com product name: ScoreBoard.

Software by Andrew titled "RF Planner" dated Jun. 17, 1997.

2. A user guide titled "Andrew Microwave System Planner" dated Jul. 1999.

3. A user guide titled "Andrew Antenna System Planner" dated Jun. 1999.

1. Article "Building Database Manipulator" Copyright, Jan. 1998; MPRG and Virginia Tech.

2. PCS 97 Track 7; Engineering & Systems Management; T. Rappaport.

3. Propagator; vol. 8, No. 3; Fall 1997.

4.SMT Plus 1.0 User's Manual; R. Skidmore & T. Rappaport; Copyright, Aug. 1996; Virginia Tech.

* cited by examiner

METHOD AND SYSTEM FOR DISPLAYING NETWORK PERFORMANCE, COST, MAINTENANCE, AND INFRASTRUCTURE WIRING DIAGRAM

CROSS-REFERENCE TO RELATED APPLICATIONS

This application is a continuation-in-part (CIP) application of U.S. Ser. No. 10/244,409filed Sep. 17, 2002, which is a continuation of U.S. patent application Ser. No. 09/352,678filed Jul. 14, 1999, now U.S. Pat. No. 6,499,006, and the complete contents of these applications is herein incorporated by reference. The invention described is also related to U.S. Pat. Nos. 6,317,599, 6,442,507, and 6,493,679, and the complete contents of these patents are herein incorporated by reference.

DESCRIPTION

BACKGROUND OF THE INVENTION

1. Field of the Invention

The present invention generally relates to engineering and management systems for the design, maintenance and optimization of communication systems. More particularly, the invention is directed to a method and apparatus for displaying the performance of wireless communication systems in any environment (e.g., buildings, floors within a building, campuses, within cities, an outdoor setting, etc.) using a three-dimensional (3-D) visualization method.

2. Background Description

As wireless communication systems proliferate, radio frequency (RF) coverage within and around buildings, and radio signal penetration into and out of buildings, has become a critical design issue for wireless engineers who must design and deploy cellular telephone systems, paging systems, or new wireless technologies such as personal communication systems,(PCS), wireless local area networks (WLAN), and local multi-point distribution systems (LMDS). In addition, RF networks involving micromachinery, RF identification tags, and optical communication links are of increasing interest. Designers are frequently requested to determine if a radio transceiver location or base station cell site can provide adequate, reliable service throughout a room, a building, an entire city, a campus, a shopping mall, or any other environment. The costs of in-building and microcellular wireless communication devices are diminishing while the workload for wireless system design engineers and technicians to deploy such systems is increasing sharply. Given these factors, rapid engineering design and deployment methods accompanied by comprehensive system performance visualization and analysis methods are vital to wireless communication system designers.

Common to all wireless communication system designs is the desire to maximize the performance and reliability of the system while minimizing the deployment costs. Analyzing radio signal coverage and interference is of critical importance for a number of reasons. A design engineer must determine if an existing wireless system will provide sufficient signal power throughout the desired service area. Alternatively, wireless engineers must determine whether local area coverage will be adequately supplemented by existing large scale outdoor wireless systems, or macrocells, or whether indoor wireless transceivers, or picocells, must be added. The placement of these cells is critical from both a cost and performance standpoint. The design engineer must predict how much interference can be expected from other wireless systems and where it will manifest itself within the environment.

Depending upon the design goals, the performance of a wireless communication system may involve a combination of one or more factors. For example, the total area covered in adequate received signal strength (RSSI), the area covered in adequate data throughput levels, and the number of customers that can be serviced by the system are among the deciding factors used by design engineers in planning the placement of communication equipment comprising the wireless system. Thus, maximizing the performance of a wireless system may involve the complex analysis of multiple, potentially unrelated factors. The ability to display the results of such analysis in a manner easily interpretable by design engineers is invaluable in wireless system deployment. Three dimensional (3-D) visualization of wireless system operating parameters provides the user with rapid assimilation of large data sets and their relation to the physical environment. As wireless systems proliferate, these issues must be resolved quickly, easily, and inexpensively, in a systematic and repeatable manner.

There are many computer aided design (CAD) products on the market that can be used to design a computerized model of an environment. WiSE™ from Lucent Technology, Inc., SignalPro™ from EDX, PLAnet™ by Mobile Systems International, Inc., and TEMS from Ericsson are examples of CAD products developed to aid in the design of wireless communication systems.

Lucent Technology, Inc., offers WiSE™ as a design tool for wireless communication systems. The WiSE system predicts the performance of wireless communication systems based on a computer model of a given environment using a deterministic radio coverage predictive technique known as ray tracing.

EDX offers SignalPro™ as a design tool for wireless communication systems. The SignalPro system predicts the performance of wireless communication systems based on a computer model of a given environment using a deterministic RF power predictive technique known as ray tracing.

Mobile Systems International, Inc., offers PLAnet™ as a design tool for wireless communication systems. The PLAnet system predicts the performance of macrocellular wireless communication systems based upon a computer model of a given environment using statistical and empirical predictive techniques.

Ericsson Radio Quality Information Systems offers TEMS™ as a design and verification tool for wireless communication indoor coverage. The TEMS system predicts the performance of indoor wireless communication systems based on a building map with input base transceiver locations and using empirical radio coverage models.

The above-mentioned design tools have aided wireless system designers by providing facilities for predicting the performance of wireless communication systems and displaying the results in the form of flat, two-dimensional grids of color or flat, two-dimensional contour regions. Such displays, although useful, are limited by their two-dimensional nature in conveying all nuances of the wireless system performance. For example, slight variations in color present in a two-dimensional grid of color, which may represent changes in wireless system performance that need to be accounted for, may be easily overlooked. Furthermore, as wireless systems proliferate, the ability to visually predict and design for coverage and interference is of increasing value.

In addition, recent research efforts by AT&T Laboratories, Brooklyn Polytechnic, and Virginia Tech are described in papers and technical reports entitled:

S. Kim, B. J. Guarino, Jr., T. M. Willis III, V. Erceg, S. J. Fortune, R. A. Valenzuela, L. W. Thomas, J. Ling, and J. D. Moore, "Radio Propagation Measurements and Predictions Using Three-dimensional Ray Tracing in Urban Environments at 908 MHZ and 1.9 GHz," IEEE *Transactions on Vehicular Technology*, vol. 48, no. 3, May 1999 (hereinafter "Radio Propagation");

L. Piazzi, H. L. Bertoni, "Achievable Accuracy of Site-Specific Path-Loss Predictions in Residential Environments," IEEE *Transactions on Vehicular Technology*, vol. 48, no. 3, May 1999 (hereinafter "Site-Specific");

G. Durgin, T. S. Rappaport, H. Xu, "Measurements and Models for Radio Path Loss and Penetration Loss In and Around Homes and Trees at 5.85 GHz," IEEE *Transactions on Communications*, vol. 46, no. 11, November 1998;

T. S. Rappaport, M. P. Koushik, J. C. Liberti, C. Pendyala, and T. P. Subramanian, "Radio Propagation Prediction Techniques and Computer-Aided Channel Modeling for Embedded Wireless Microsystems," ARPA Annual Report, MPRG Technical Report MPRG-TR-94-12, Virginia Tech, July 1994;

T. S. Rappaport, M. P. Koushik, C. Carter, and M. Ahmed, "Radio Propagation Prediction Techniques and Computer-Aided Channel Modeling for Embedded Wireless Microsystems," MPRG Technical Report MPRG-TR-95-08, Virginia Tech, July 1994;

T. S. Rappaport, M. P. Koushik, M. Ahmed, C. Carter, B. Newhall, and N. Zhang, "Use of Topographic Maps with Building Information to Determine Antenna Placements and GPS Satellite Coverage for Radio Detection and Tracking in Urban Environments," MPRG Technical Report MPRG-TR-95-14, Virginia Tech, September 1995;

T. S. Rappaport, M. P. Koushik, M. Ahmed, C. Carter, B. Newhall, R. Skidmore, and N. Zhang, "Use of Topographic Maps with Building Information to Determine Antenna Placement for Radio Detection and Tracking in Urban Environments," MPRG Technical Report MPRG-TR95-19, Virginia Tech, November 1995; and S. Sandhu, M. P. Koushik, and T. S. Rappaport, "Predicted Path Loss for Rosslyn, VA, Second set of predictions for ORD Project on Site Specific Propagation Prediction," MPRG Technical Report MPRG-TR-95-03, Virginia Tech, March 1995.

The papers and technical reports are illustrative of the state-of-the-art in site-specific radio wave propagation modeling. While most of the above papers describe a comparison of measured versus predicted RF signal coverage and present tabular or two dimensional (2-D) methods for representing and displaying predicted data, they do not report a comprehensive method for visualizing and analyzing wireless system performance. The "Radio Propagation" and "Site-Specific" papers make reference to 3-D modeling, but do not offer display methods or graphical techniques to enable a user to visualize signal coverage or interference in 3-D.

SUMMARY OF THE INVENTION

It is therefore an object of the present invention to facilitate the three-dimensional, multi-colored display of predicted performance results for any type of wireless communication system, or any communication system, network, or the like which includes wireless communication components.

It is another object of the present invention to provide a mechanism for viewing a three-dimensional display of predicted performance results from any angle, orientation, distance, or perspective.

It is still another object of the present invention to provide a mechanism for viewing a three-dimensional display of predicted performance results and interacting with the display in real-time to alter the current viewpoint and perspective.

It is another object of the present invention to provide a method and system for displaying predicted performance results overlaid on a three-dimensional database that may involve a plurality of building structures and the surrounding terrain, flora, climatic conditions, and additional static and dynamic obstacles (e.g., automobiles, people, filing cabinets, etc.).

It is yet another object of the present invention to provide a mechanism for coloring, shading, and otherwise rendering a solid representation of said three-dimensional display utilizing multiple colors and transparency effects.

It is still another object of the present invention to provide a mechanism for generating and displaying infrastructure wiring diagrams that may be viewed, revised, or exported to additional applications programs.

According to the present invention, a system is provided for allowing a RF system designer to dynamically model a wireless system electronically in any environment. The method includes the selection and placement of models of various wireless system hardware components, such as antennas (point, omnidirectional, directional, leaky feeder, etc.), transceivers, amplifiers, cables, splitters, and the like, and allows the user to visualize, in three-dimensions, the effects of their placement and movement on overall system performance throughout the modeled environment. Thus, the placement of components can be refined and fine-tuned prior to actual implementation of a system to ensure that all required regions of the desired service area are blanketed with adequate RF coverage, data throughput, or system performance. The three-dimensional (3-D) visualization of system performance provides RF system designers with tremendous insight into the functioning of the modeled wireless communication system, and represents a marked improvement over previous visualization techniques.

To accomplish the above, a 3-D model of the physical environment is stored as a computer-aided design (CAD) model in an electronic database. CAD facilities may be provided to aid in the design or modification of the CAD model. The physical, electrical, and aesthetic parameters attributed to the various parts of the environment, such as walls, floors, foliage, buildings, hills, and other obstacles that affect radio waves are also preferably stored in the database.

A representation of the 3-D environment is displayed on a computer screen for the designer to view. The designer may view the entire environment in simulated 3-D, zoom in on a particular area of interest, or dynamically alter the viewing location and perspective to create a "fly-through" effect. Using a mouse or other input positioning device the designer may select and view various communication hardware device models from a series of pull-down menus. A variety of amplifiers, cables, connectors, and other hardware devices may be selected, positioned, and interconnected in a similar fashion by the designer to form representations of complete wireless communication systems.

A region of any shape or size may be selected anywhere within the displayed environment, or be automatically selected based upon certain criteria (e.g., selecting an entire building). The selected region is overlaid with a grid containing vertices of selectable size, shape, and spacing to form a mesh or blanket. Each vertex corresponds to a single point within the 3-D environment. Thereafter, a wireless system performance prediction model is run whereby the computer displays on the screen at each vertex of the mesh the predicted RF values, for instance, received signal strength intensity (RSSI), network throughput, bit error rate, frame error rate, signal-to-interference ratio (SIR), and signal-to-noise ratio (SNR), provided by the communication system just designed. The display is such that the computer adjusts the elevation and/or coloring including characteristics such as saturation, hue, brightness, line type and width, transparency, surface texture, etc., of each vertex relative to the surrounding vertices to correspond to the calculated RF values. The coloring and elevation may correspond to the same calculated RF value or to different calculated RF values. For example, elevation may correspond to received or radio signal strength intensity (RSSI), and color may correspond to signal-to-noise ratio (SNR), or any other of a variety of calculated RF parameters. The user is able to specify boundaries for this display in terms of selecting the range of elevations, colors, or other aesthetic characteristics from which the vertices of the mesh are assigned. Alternatively, the system can automatically select limits and ranges for the heights, colors, and other aesthetic characteristics. The result is a region of fluctuating color and elevation representing the changing wireless system performance throughout different portions of the modeled 3-D environment. The region may be viewed overlaid with the 3-D environment.

The invention also provides a facility for creating, and exporting infrastructure wiring diagrams for the communication system. In particular, during or after creation of a computerized, site specific model of a communications system which preferably includes wireless components, the features of the physical environment can be selectively eliminated from the display or be present at a significantly reduced prominence in the display. This preferably leaves a 2-D or 3-D infrastructure wiring diagram of the components that are or will be used in the communication system. For example, cabling extending from base stations and antennas, splitters, as well as electrical power components or the like, can be displayed as a "layer" in a CAD presentation without viewing the walls, windows, doors or other features of the physical environment (or with viewing these physical features in reduced prominence relative to the infrastructure wiring diagram. When the communication system is designed, analyzed or optimized in the context of a 3-D physical environment, the infrastructure wiring diagram may also preferably be displayed in 3-D; however, views from the sides of the physical structure can be used to provide 2-D images of the infrastructure which may be useful in some applications.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present method and apparatus allow for assessing the performance of a wireless communication system to a much higher level of precision than previously possible. The present method is a significant advance over the prior art in the display of predicted performance of wireless communication systems. The design of wireless communication systems is often a very complex and arduous task, with a considerable amount of effort required to simply analyze the results of predicted performance. In the prior art, the only options available for displaying predicted coverage areas involve the two-dimensional display of boundary contours or colored grids overlaid with a two-dimensional representation of the environment. It would be advantageous to a design engineer to have more information conveyed with respect to the communication system and its predicted or measured performance in the physical environment.

Figure 1:
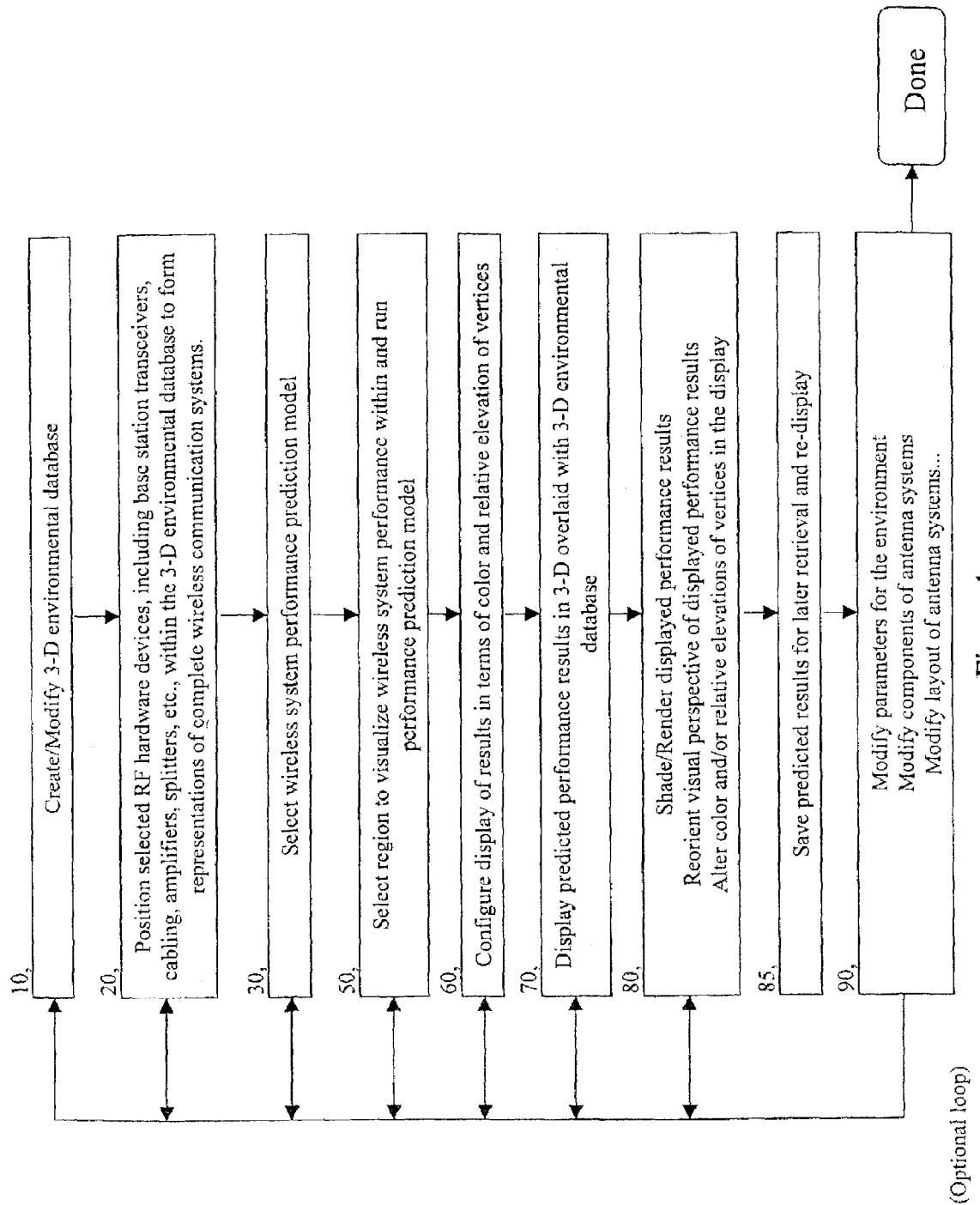
FIG. 1 is is a flow diagram of the general method of the present invention.

Referring to FIG. 1, there is shown a flow diagram according to the present invention. Before one can run an automated performance predictive model on a desired environment, a 3-D electronic representation of that environment must be created in function block 10. The preferred method for generating a 3-D environmental database will use lines and polygons that correspond to and represent physical objects within the environment. For example, a line or other shape in the database could represent a wall, a door, a tree, a building wall, or some other physical object in the modeled environment.

From the standpoint of radio wave propagation, each obstruction/partition in an environment (i.e., each line or polygon in the drawing) has electromagnetic properties that affect a radio wave. When a radio wave signal intersects a physical surface, it interacts with the electromagnetic properties of the surface. A certain percentage of the radio wave reflects off of the surface and continues along an altered trajectory; a certain percentage of the radio wave penetrates through the surface and continues along its course; a certain percentage of the radio wave is scattered once it strikes the surface, etc. The electromagnetic properties given to the obstruction/partition defines this interaction, and thus defines the break down in percentages of the radio wave reacting in a given manner upon intersection. In terms of the environmental database, each obstruction/partition has several parameters used to define its electromagnetic properties. For example, the attenuation factor of a partition determines the amount of power lost by a radio signal that penetrates through it; the reflectivity of a partition determines the portion of the radio signal reflected from it; and the surface roughness of a partition determines the portion of the radio signal that is scattered upon intersection.

Once the 3-D environmental database has been constructed, the designer identifies and specifies the location and type of all communication system equipment within the 3-D environmental database in function block 20. The communication system equipment may be wired or wireless, etc. This point-and-click process involves the user selecting the desired hardware component from a computer parts database and then visually positioning, orienting, and interconnecting various hardware components within the 3-D environmental database to form complete wireless communication systems. The preferred embodiment of the computer parts database, referred to hereinafter as a parts list library, is more fully described in U.S. Pat. No. 6,493,679, which is herein incorporated by reference. The resulting interconnected network of base stations, base station controllers, amplifiers, attenuators, antennas, coaxial cabling, fiber optic cabling, splitters, repeaters, transducers, converters, couplers, leaky feeder cables, hubs, switches, routers, firewalls, power distribution lines, copper wiring, twisted pair cabling, wireless access points, and other RF hardware components (commonly known as a wireless distribution or antenna system) is preferably assembled using either a drag-and-drop or a pick-and-place technique and is graphically displayed overlaid with the 3-D environmental database. Each component utilizes electromechanical information available from the parts list library that fully describes the component in terms of its physical operating characteristics (e.g., the noise figure, frequency, radiation characteristics, etc.). This information is directly utilized during the prediction of wireless system performance metrics.

In function block 30, the designer selects the wireless communication system performance predictive model to utilize. The preferred embodiment uses a number of methods to predict and optimize performance in a wireless communication network. These include methods to incorporate and build upon performance prediction techniques such as those described in the previously cited and following technical reports and papers: "Interactive Coverage Region and System Design Simulation for Wireless Communication Systems in Multi-floored Indoor Environments: SMT Plus," *IEEE ICUPC '96 Proceedings*, by R. Skidmore, T. Rappaport, and A. L. Abbott, and "SitePlanner 3.16 for Windows 95/98/NT User's Manual", Wireless Valley Communications, Inc. 1999. It would be apparent to one skilled in the art how to apply other wireless communication system performance models to this method.

Next, the designer selects the area within the 3-D environmental database in which to predict how the currently modeled wireless communication systems will perform in function block 50. This is preferably a point-and-click process in which the designer uses the mouse or other pointing device to designate the boundary of a region that encapsulates the area of interest within the 3-D environmental database. The region identified by the user represents a two-dimensional (2-D) plane within the 3-D environmental database. Once the region has been identified, the computer automatically segments the region into a grid of vertices ("mesh"). As will be discussed in more detail below, in the preferred embodiment, the designer is free to specify the size of each vertex and spacing between vertices of the mesh, and the configuration of the mesh may also be customized. Although the designated region is rectangular in the preferred embodiment of the invention, one skilled in the art could see that the designated region could be of any shape. The computer then calculates the selected wireless system performance predictive model on the region.

Once the performance prediction is complete, the designer is free to configure the display of the results in function block 60. The displayed results may be presented on a display screen, printed or otherwise 3-D rendered. The range of values to display and the color and other aesthetic characteristics such as saturation, hue, brightness, line type and width, transparency, surface texture, etc., to associate with each value are selectable, or may be automatically adjusted by the system. For example, if displaying received or radio signal strength intensity (RSSI), the user may select to only display those portions of the region having a predicted RSSI within the range −50 dBm to −75 dBm, and may assign specific colors to correspond to RSSI values within that range. For example, the user may assign the color red to represent a predicted RSSI value between −50 dBm and −55 dBm, green to represent a predicted RSSI value between −56 dBm and −60 dBm, etc. Thus, the region is displayed, in function block 70, as a pattern of fluctuating colors where the color assigned to each vertex within the grid corresponds to a certain value for the predicted performance metric.

In similar fashion, each vertex of the grid may be repositioned vertically in 3-D space. The elevation of each vertex directly corresponds to a certain value of predicted performance. In the preferred embodiment of the invention, the user specifies the maximum and minimum elevation to assign to vertices, and the computer automatically scales the elevation of each vertex according to its predicted performance value. For example, if the user selects a minimum height of 0.0 meters and a maximum height of 20.0 meters, and the predicted performance values for the entire grid range from −50 dBm to −70 dBm for an RSSI prediction, then if a given vertex has a value of −60 dBm it will be assigned an elevation of 10.0 meters. All elevations are specified relative to the 3-D environmental database.

Any combination of elevation, color, and other aesthetic characteristics may be used to customize the display of predicted performance results. For example, signal-to-interference ratio (SIR) may be displayed as fluctuating elevation within the region while received signal strength (RSSI) is displayed by fluctuating colors. Measured and predicted performance metrics may be displayed in a similar manner. Data throughput may be displayed as varying colors while bit error rate (BER) is displayed using differing line types. Any combination of elevation, color, and aesthetic characteristics may be associated with any combination of predicted performance result metric to produce the 3-D display.

The results of the performance prediction are displayed in function block 70 overlaid with or superimposed on the 3-D environmental database, allowing the user to analyze the performance of the current wireless communication system design. The display can be further customized in function block 80. The designer may re-orient the viewing direction and zoom factor of the display to achieve varying perspectives of the predicted results. The results may be redisplayed in a variety of forms, including 3-D wireframe with hidden lines removed, 3-D semi-transparent, 3-D shaded or patterned, 3-D rendered, or 3-D photo-realistically rendered.

The designer is free to interact with the displayed results in a variety of ways, including real-time panning and zooming to create a "fly-through" effect. The predicted performance results may be saved for later recovery and redisplay in function block 85.

The designer may then decide to modify the electromagnetic or electromechanical properties assigned to objects within the 3-D environmental database, modify the type, orientation, or placement of components within the antenna systems, and/or add or remove wireless system hardware components in function block 90. Performance predictions can then be repeated and the results displayed as described above. Once the design is as desired, then the 3-D database contains all of the information necessary to procure the necessary components for installing the wireless system. The locations of each component are clearly displayed, and a visual 3-D representation can be viewed as a guide.

In addition, in function block 90, the various components of the communication system (i.e., transmitters, receivers, transceivers, antennas, cables, etc.) can be moved within the environment as well as components of the environment itself in real time. In this manner, the displayed results superimposed on the displayed 3-D environment are also updated in real time allowing the designer to immediately ascertain the effect of the repositioning.

The preferred embodiment of the invention utilizes a 3-D environmental database containing information relevant to the prediction of wireless system performance. This information includes but is not limited to the location, physical, electrical, and aesthetic properties of objects within the 3-D environment, where an object is any physical entity or landscape feature, such as a tree, wall, door, person, climatic condition, hill, etc.

Figure 2:
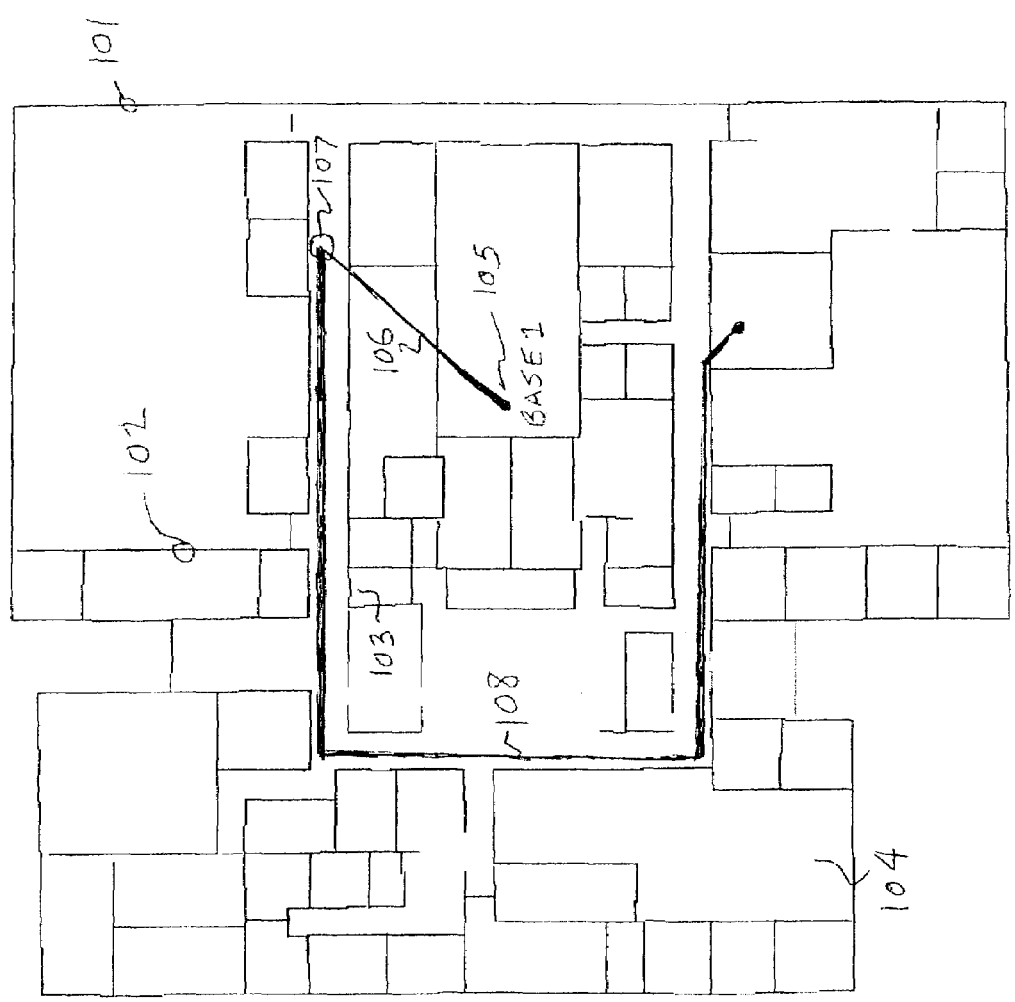
FIG. 2 shows an example of a simplified layout of a floor plan of a building.

Referring now to FIG. 2, there is shown a two-dimensional (2-D) simplified layout of a building floor plan. The method uses a three-dimensional (3-D) computer aided design (CAD) representation of a building, a collection of buildings, and/or the surrounding terrain and foliage. However, for simplicity of illustration, a 2-D figure is used. The various physical objects within the environment such as external walls 101, internal walls 102, doors 103, and floors 104 are assigned appropriate physical, electrical, and aesthetic values such as height, attenuation or RF penetration loss, surface roughness, reflectivity, color, etc. The attenuation factor describes the amount of power a radio signal loses upon striking a given object. The surface roughness provides information used to determine the portion of a radio signal that is scattered and/or dissipated upon striking a given object. The reflectivity provides information used to determine the portion of a radio signal that is reflected upon striking a given object. The values for these and other parameters assigned to objects within the 3-D environmental database vary depending upon the type of object being represented. For example, external walls 101 may be given a 15 dB attenuation value and have a very rough surface, whereas the interior walls 102 may only have a 3.2 dB attenuation loss.

Figure 3:
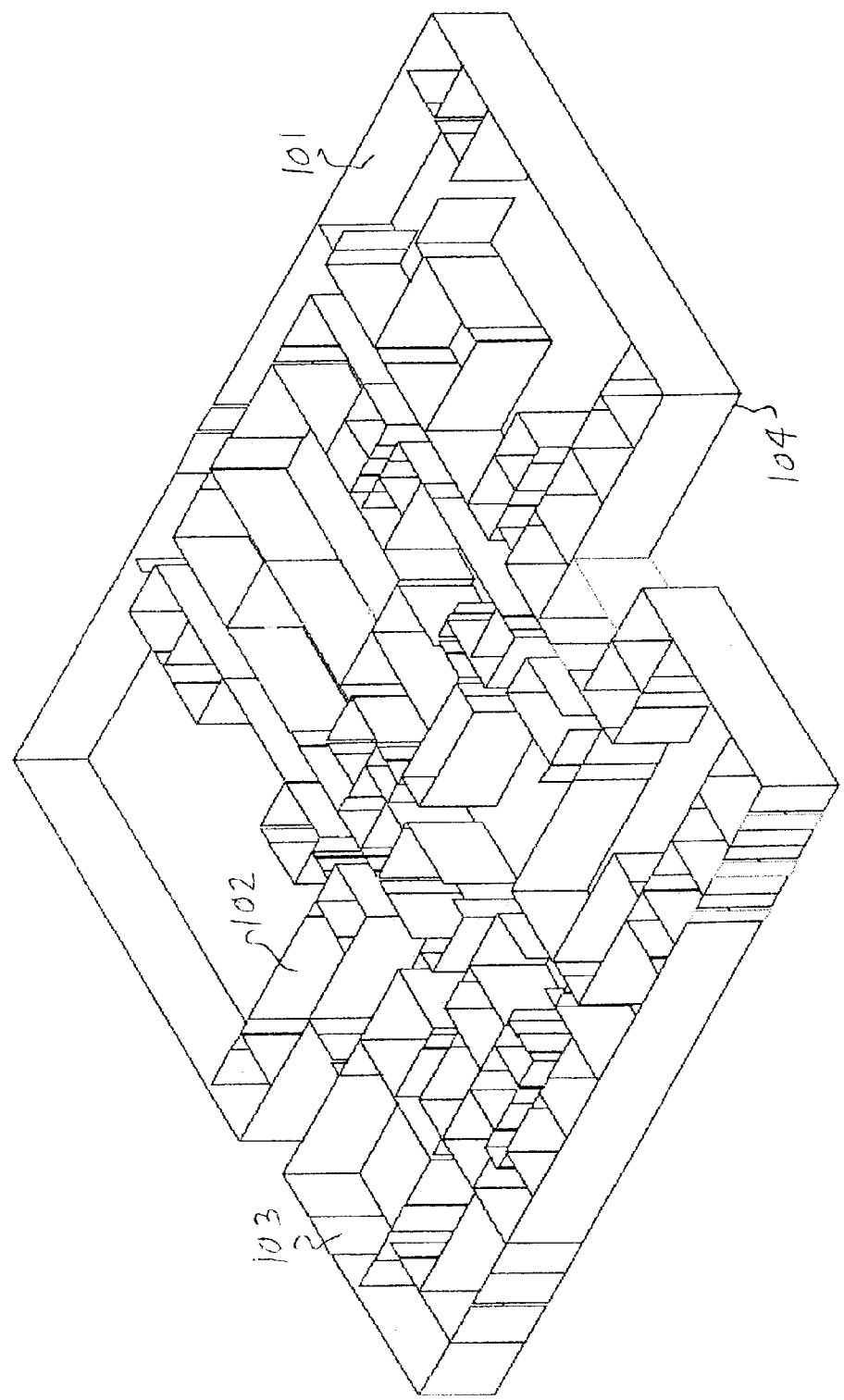
FIG. 3 shows a three-dimensional perspective of a building floor plan.

The three-dimensional nature of the environmental database is shown in FIG. 3, which displays the same building layout as in FIG. 2 from a different orientation. Again, the physical objects within the environment such as external walls 101, internal walls 102, doors 103, and floors 104 are easily identifiable.

Estimated partition electrical properties may be extracted from extensive propagation measurements already published, or the partition parameters can be measured directly and optimized instantly using the present invention combined with those methods described in U.S. Pat. No. 6,442,507 which is herein incorporated by reference. Once the desired physical and electrical properties are specified for the objects in the environment, any desired number of wireless system devices can be placed at any location in the 3-D environmental database, and performance predictions can be plotted directly onto the CAD drawing. The 3-D environmental database could be built through any number of methods.

A base station transceiver 105 has been positioned and modeled within the 3-D environmental database. A length of cable 106 has been connected to the base station transceiver and extended throughout a portion of the database. A connector 107 has been attached to the end of the cable 108, and a length of radiating cable or leaky feeder 108 has been run throughout the database. Because the method allows any type of wireless system to be modeled, while analyzing the component and installation costs as disclosed in U.S. Pat. No. 6,493,679, "what-if" designs and scenarios can be carried out with minimum guess work and wasted time.

FIG. 3 depicts the three-dimensional perspective of a building floor plan. Referring to FIG. 3, there are several partitions within the building structure, including exterior concrete walls 101 and interior sheetrock walls 102.

Figure 4:
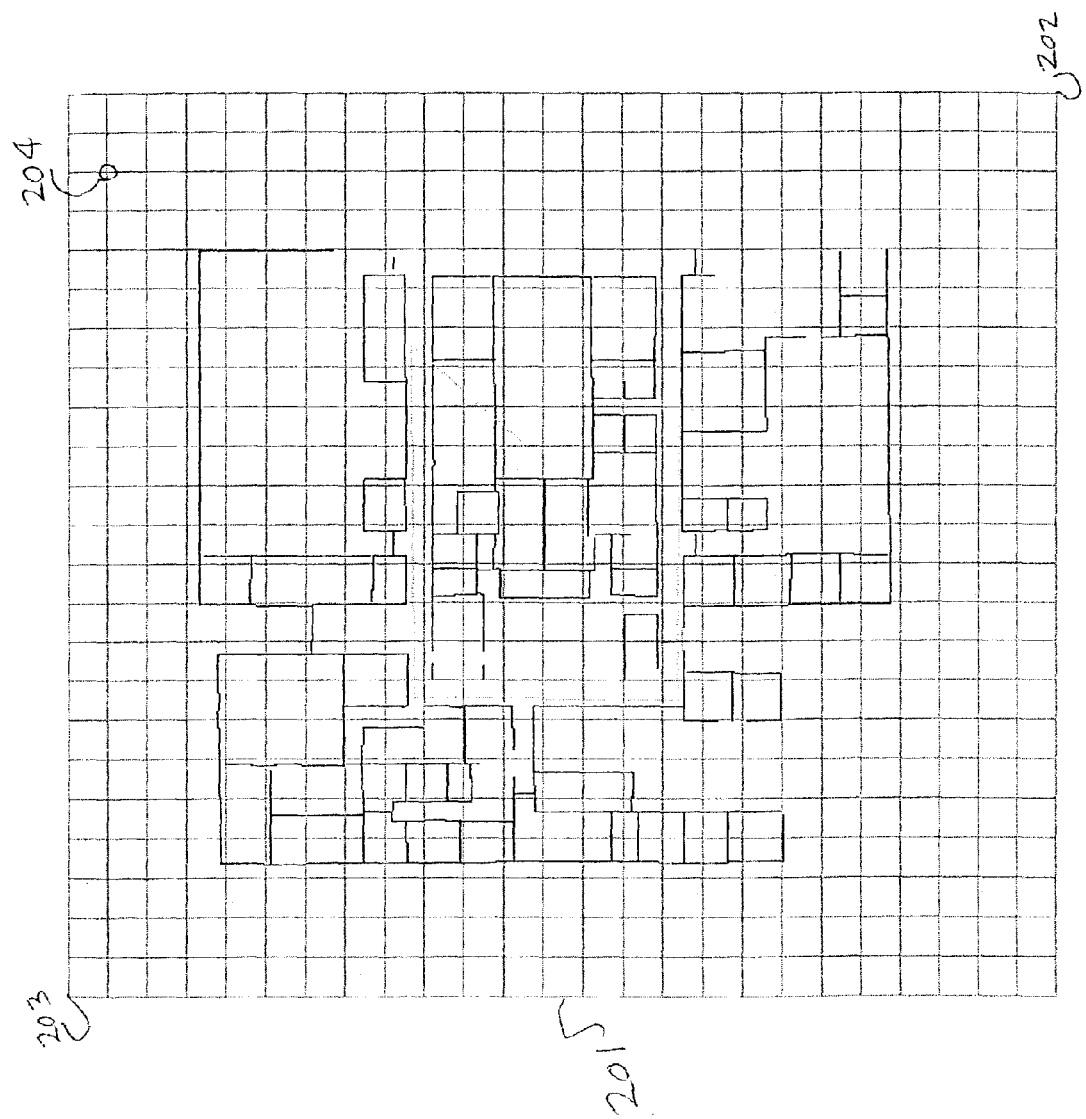
FIG. 4 shows an example region segmented into a grid that has been selected by a RF designer for displaying wireless system performance.

FIG. 4 depicts the same environmental database as shown in FIG. 3. The designer has specified the region within which the computer is to predict and display the performance of the modeled wireless communication systems. The region 201, is identified with a mouse or other input device by pointing and clicking on locations 202 and 203 within the 3-D environmental database. This identifies the opposite diagonals of a region within the database. Alternatively, the entire modeled environment can be automatically selected and bounded to form the region. The region is then segmented into a grid of vertices, known as a mesh. The user may specify the spacing between each vertex 204 of the mesh. If the spacing is reduced, the number of vertices is automatically adjusted to cover the region identified by the user. Thus, by reducing the spacing between the vertices, the user may control the number of vertices that form the mesh. Each vertex 204 corresponds to a location within the 3-D environmental database at which a performance prediction will be carried out and displayed. Thus, having smaller spacings between vertices will provide more locations where performance prediction will be performed, while larger spacings may allow faster computation since less predictions will be performed.

Figure 5:
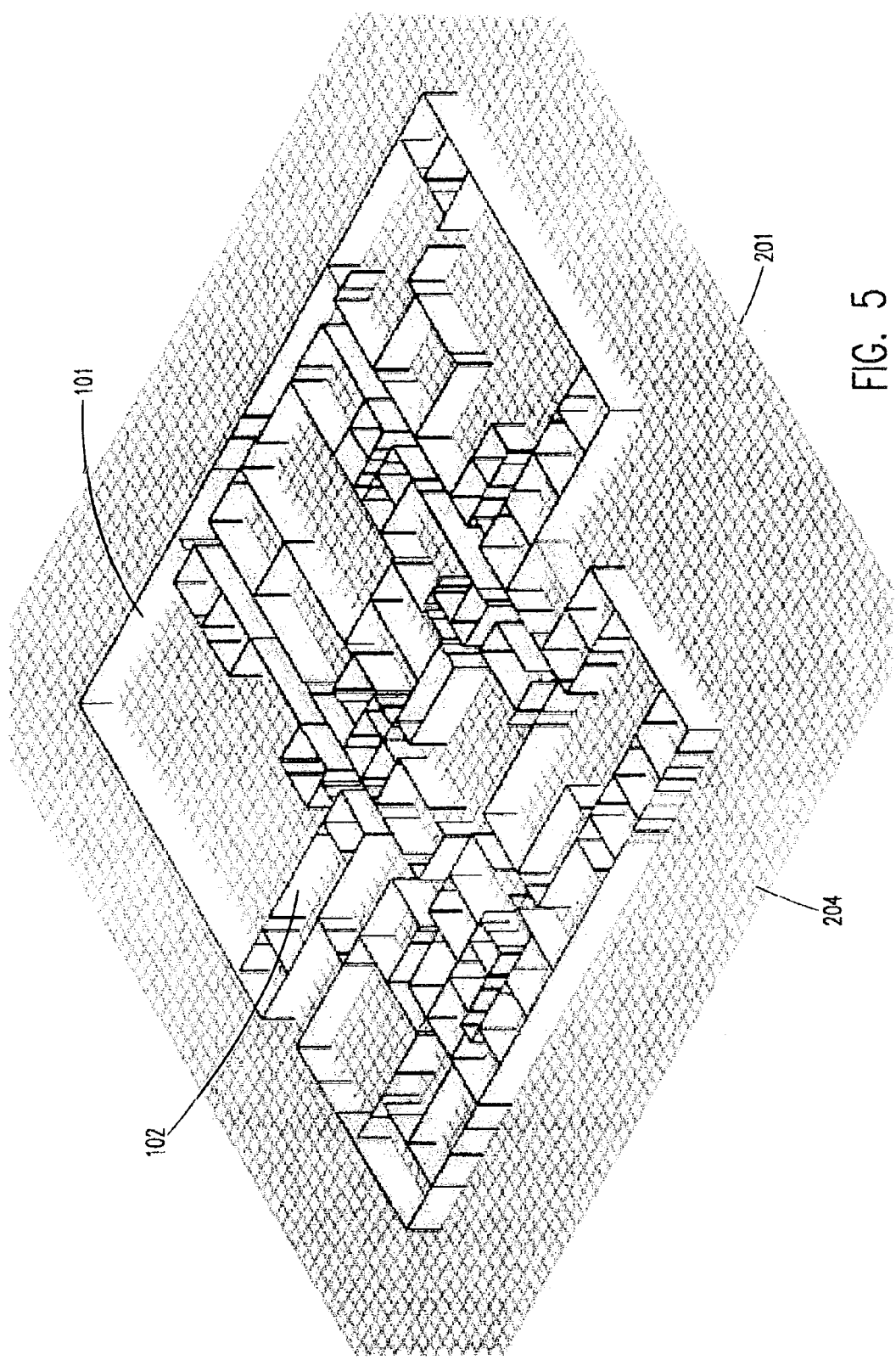
FIG. 5 shows a region similar to that shown in FIG. 3 prior to the calculation of wireless system performance and from a three-dimensional perspective.

FIG. 5 depicts the identical environmental database as shown in FIG. 4 from a three-dimensional perspective.

Figure 6:
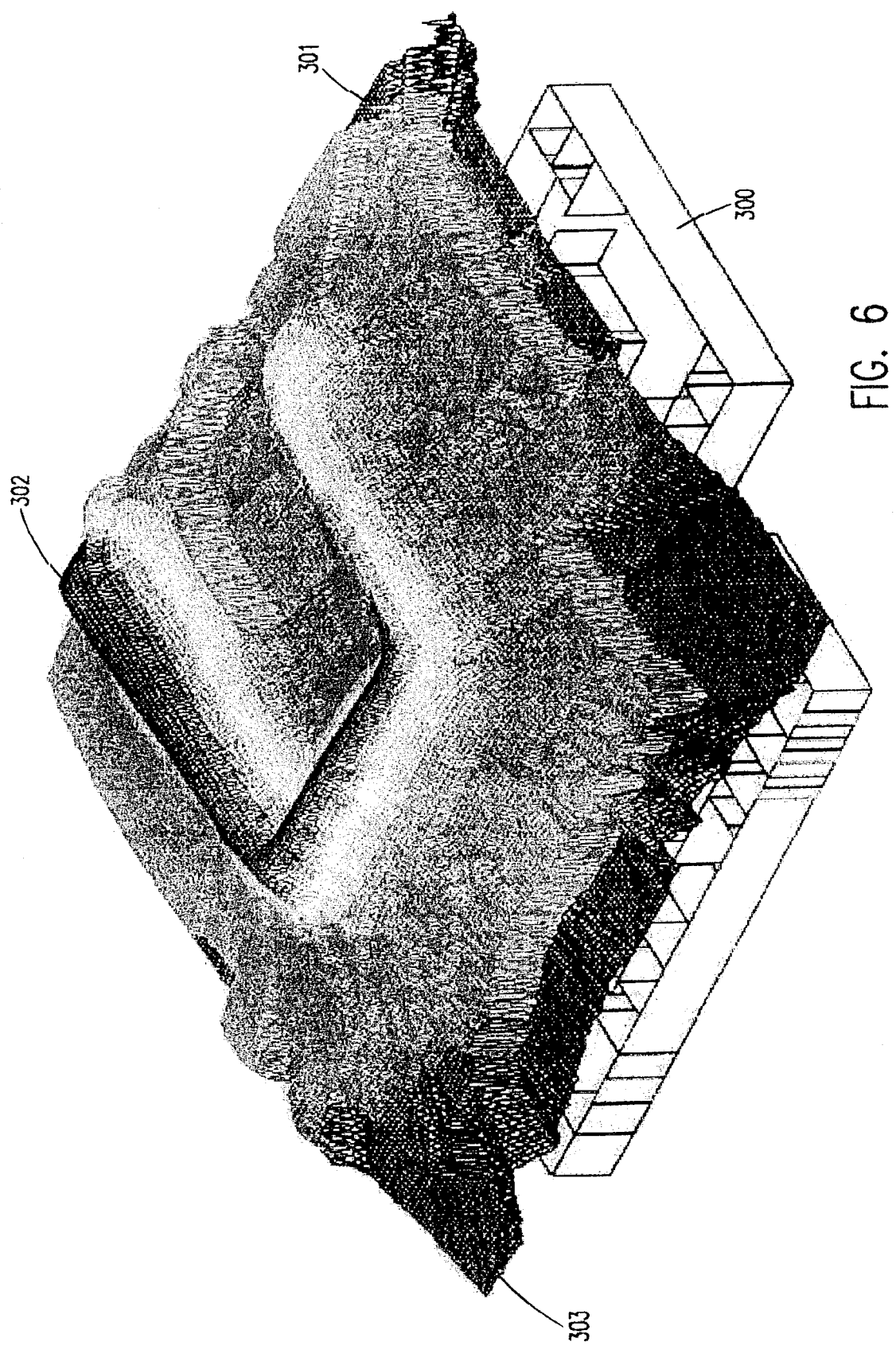
FIG. 6 shows the same region as in FIG. 3 following the calculation of wireless system performance and is exemplary of the three-dimensional display of system performance from the present invention.

FIG. 6 depicts the identical environmental database as shown in FIG. 5 following the prediction of performance for the wireless communication system modeled in FIG. 2. FIG. 6 shows received signal strength intensity (RSSI) as predicted within the modeled building environment for the base station transceiver 105 and the leaky feeder antenna 108 of FIG. 2. In FIG. 6, the building environment 300 is displayed underneath the predicted RSSI values. These values are calculated, for example using models as described in co-pending application Ser. No. 09/318,840. The grid 301 has assumed the form of a multi-colored region of fluctuating heights. Each vertex 204 within the grid from FIG. 3 has had both its color and elevation altered to represent the value of RSSI predicted for the point in 3-D space within the environmental database corresponding to the initial position of the vertex in FIG. 3. For example, in FIG. 6, vertices 302 with a relatively high elevation may be shown in red correspond to a higher level of predicted RSSI, while vertices 301 and 303 with a relatively lower elevation corresponding to a lower level of predicted RSSI may be shown in blue, with intermediate heights shown in progressive shades of red to blue or purples. The relative color, elevation, and other aesthetic characteristics of each vertex corresponds to the RSSI value predicted to occur. Although, the displayed results are shown strictly in terms of RSSI, one skilled in the art could see how this applies regardless of the performance metric selected. For example, in the present embodiment of the invention, similar displays could be generated for radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, $E_cI_o$, system performance parameters, equipment price, maintenance and cost information, all in either absolute or relative terms.

Figure 7:
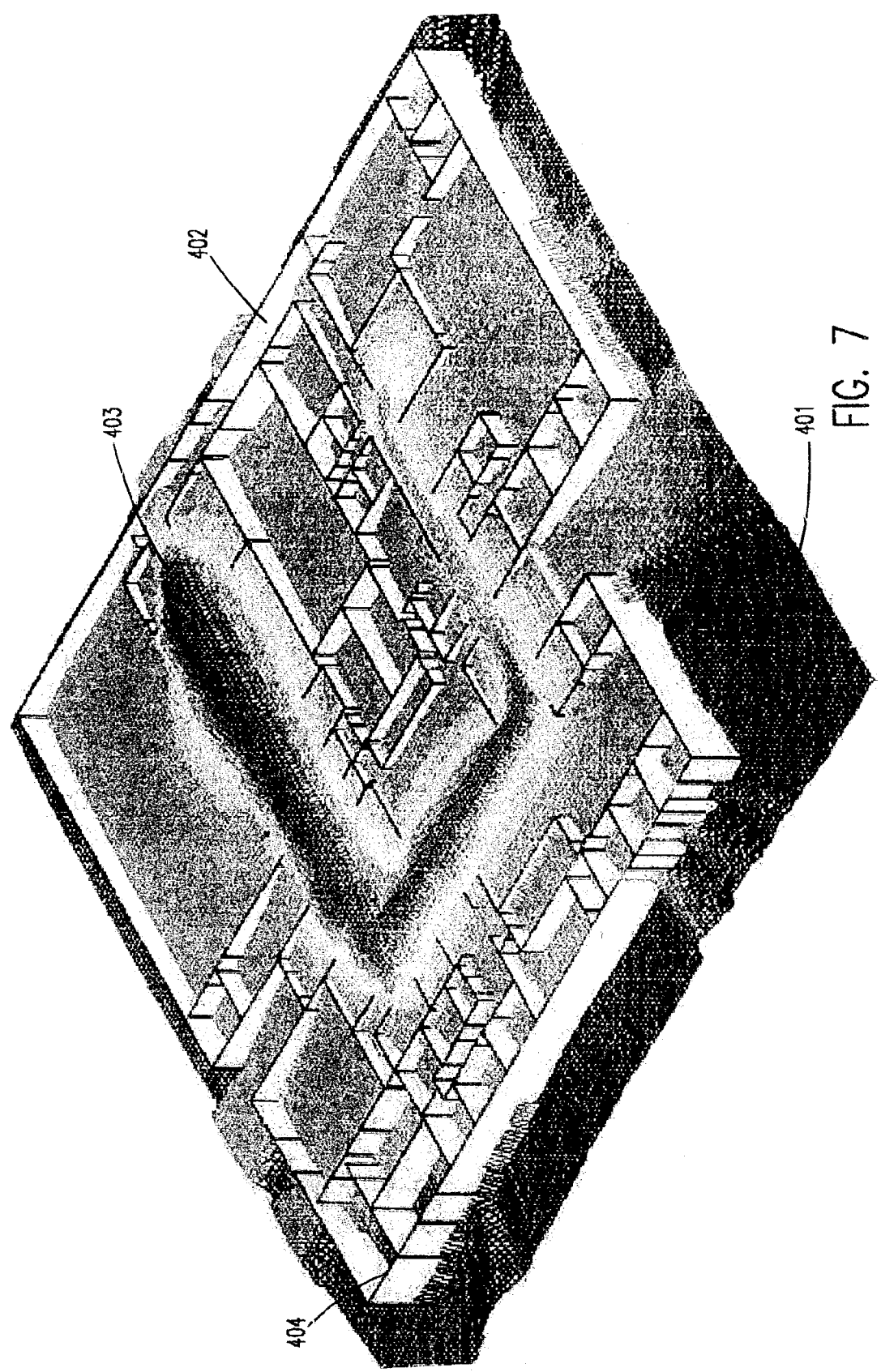
FIG. 7 shows the same region as in FIG. 6 following the user reducing relative elevations of the vertices and thus altering the display.

FIG. 7 depicts the identical results as shown in FIG. 6 with the exception that the user has altered the relative heights assigned to the vertices. The visual effect is to overlap the predicted performance results 401 with the 3-D environmental database 402. Such a perspective enables the designer to instantly recognize areas within the environment where there is sufficient system performance 403 and areas where there is inadequate system performance 404 simply by noting the color and/or relative height of the predicted results.

Figure 8:
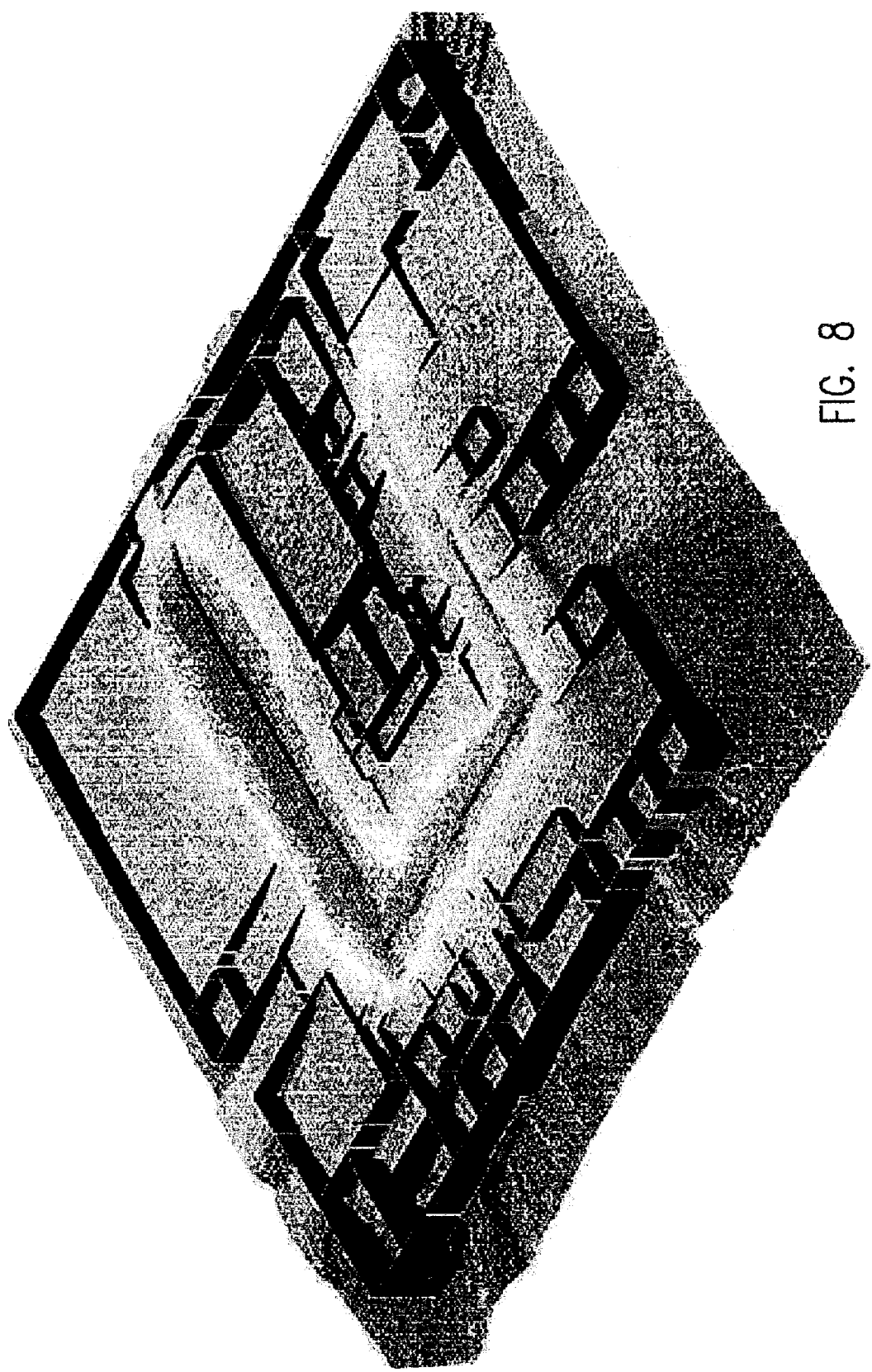
FIG. 8 shows the same region as in FIG. 7 following the user shading the display to produce an altered perspective of the performance results.

FIG. 8 depicts the identical results as shown in FIG. 7 with the exception that the user has shaded the environment produce a more realistic visual representation.

Figure 9:
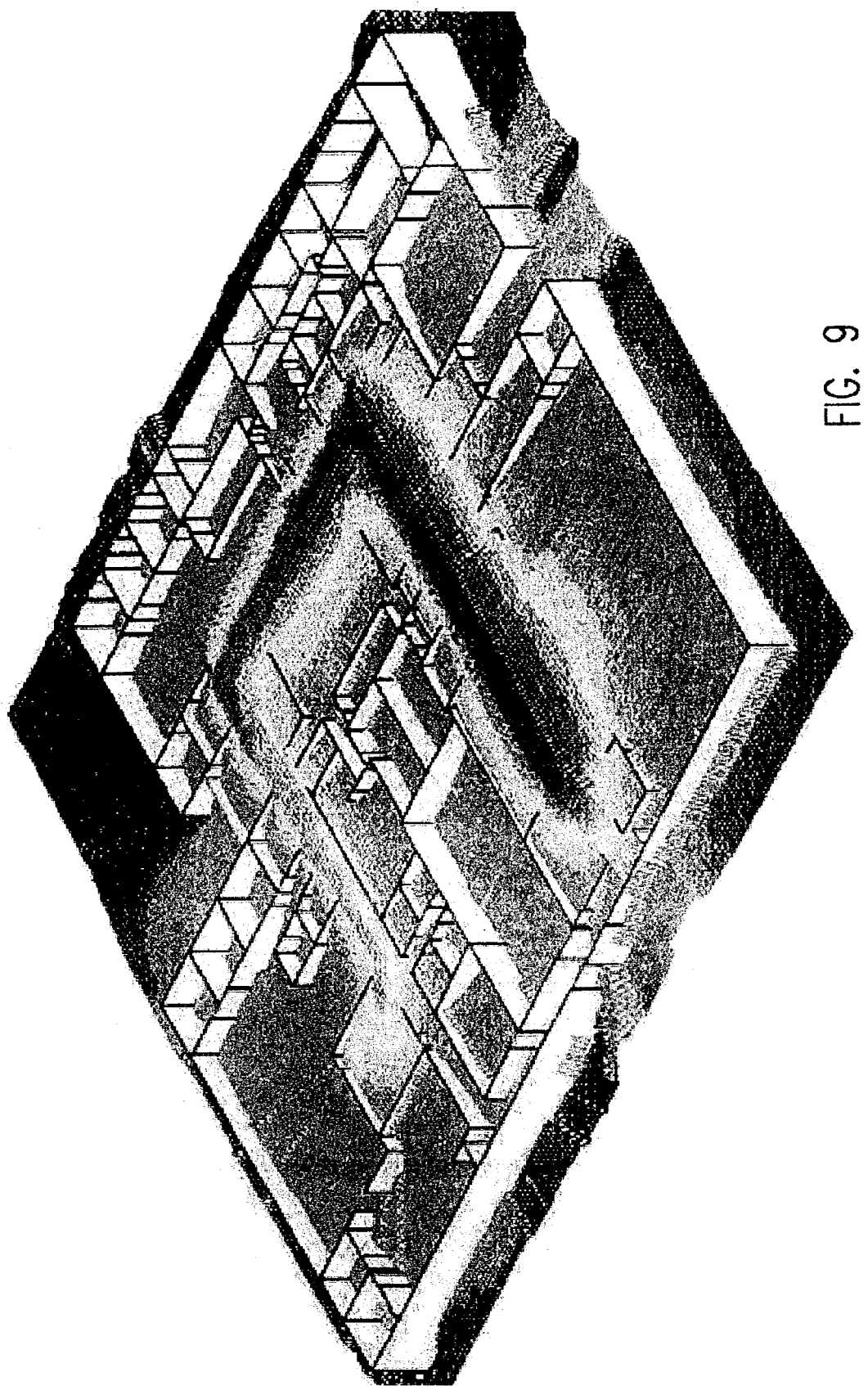
FIG. 9 shows the same region as in FIG. 6 following the user changing the view orientation to provide a different perspective of the performance results.

FIG. 9 depicts the identical results as shown in FIG. 7 with the exception that the user has altered the viewing orientation to achieve a different perspective of the predicted performance results. In the practice of this invention, the designer may rotate the displayed region about a vertical axis so that the region may be viewed from different angles. This will be advantageous in identifying and analyzing rooms in which performance characteristics may be at higher levels along one wall and at lower levels along an opposing wall. When only a single orientation is provided, some information may be obstructed from view by a wall or other physical object. The invention may also allow varying the angle of view from the Z-axis perspective from a zero degree side view to a 90 degree plan view.

Figure 10:
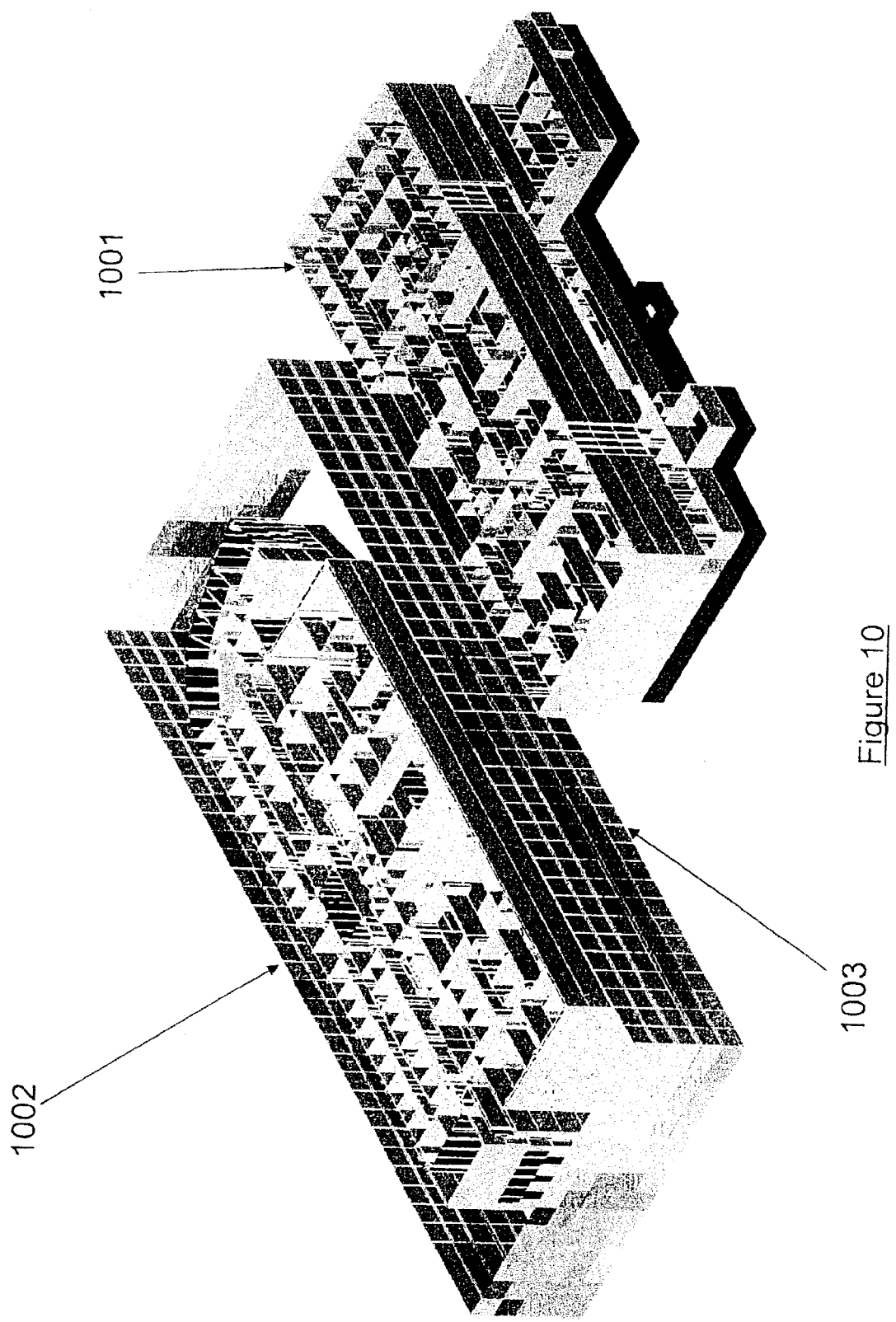
FIG. 10 shows an illustration of an example output according to the present invention.

Referring to FIG. 10, there is shown another example output of the specified invention. A three dimensional representation of the environment 1001 is modeled and represented by the invention. Note that a part of a building, consisting of parts or whole elements of one or more building floors, or multiple buildings, or walls, or obstructions, or other environments may be modeled and visualized.

In the case of FIG. 10, the environment 1001 being represented is two buildings positioned adjacent to one another. Each building consists of multiple floors and contains both internal and external obstructions, objects, and entities which may represent the physical environment as well as the communications equipment infrastructure. Within the model of the environment, the user has positioned and configured a model of a communication system which consists of interconnected hardware components. A region of any shape or size within the environmental model may be selected based upon certain criteria (e.g., selecting an entire building, selecting a particular building floor or portion thereof, etc.). In FIG. 10, the invention has used what is known as "fence" mode to construct a vertical mesh 1002 surrounding the selected region. The region may be selected automatically with a predefined set of selection rules, or may be specified by the user who desires to see particular performance at specific regions, along walls, along floors, along perimeters, or at any other location in either vertical or horizontal space. The user may, for example, specify the particular region for display by using a pointing instrument such as a computer mouse or pen, computer keyboard, or any other means such as pull-down menu, a toolbar, a dialog box, eye controlled mechanism etc. to designate or highlight particular positions or regions (e.g., floor number, corner of a building, rooftop, latitude and/or longitude, elevation, wall, perimeter, building number, etc.) within the environmental model. Thus, it is possible to view predicted or measured performance throughout any region within the environmental model, including but not limited to vertical, horizontal, angular planar or geometrically shaped regions of the modeled environment.

In FIG. 10, the selected region is overlaid with a vertically spaced grid—"fence"—containing vertices of selectable size, shape, and spacing to form a mesh or fence 1002. Referring to FIG. 10, a selected region 1002 is selected such that it surrounds one of the buildings within the figure as if by a fence. Thereafter, a wireless system performance prediction model is run, or measurements may be made, whereby the computer displays on the screen at each vertex of the mesh the predicted or measured network performance values and/or metrics. Every embodiment described herein, including that shown in FIG. 10 and in other drawing figures, may include measured and/or predicted data. The performance values and/or metrics include but are not limited to: received signal strength intensity (RSSI), signal-to-interference ratio (SIR), signal-to-noise ratio (SNR), bit error rate (BER), frame error rate (FER), packet error rate, throughput, capacity, handoff regions, quality of service regions, coverage zones, interference levels, physical costs, installation costs, maintenance costs, or any other performance value and/or metric known now or in the future. For example, it should be clear that one or more multiple-input multiple-output (MIMO) antenna systems or modems or emerging network management and schedule control algorithms could be modeled both in terms of hardware and/or measured/predicted performance in this invention. The display is such that the computer adjusts the horizontal position and/or coloring including characteristics such as saturation, hue, brightness, line type, and width, transparency, surface texture, etc., of each vertex of the mesh relative to the other vertices. The result as shown in FIG. 10, is a region 1002 represented by a mesh detailing the performance of the wireless communication network overlaid onto a 3-D representation of an environment. The position and/or coloration 1003 at each vertex in the mesh 1002 fluctuate as a function of the position of the mesh vertex in three-dimensions. This has the visual effect of showing a user how a performance value and/or metric changes as one would move throughout the environmental model. For example, one can see in FIG. 10 that at vertex 1003 the performance metric changes as one goes higher in the building or towards the rear of the building.

By analyzing the displayed vertical mesh, a wireless network architect or maintenance technician may quickly determine communication network performance across any vertical region surrounding the facility. Such information may be critical to such communications networks as wireless LANs, where signal power across floors or leaving a facility may expose the network to a potential security risk or cause increased interference.

In addition, it should be clear to one skilled in the art that the selected region need not be limited to either a horizontal or vertical mesh. The mesh could be constructed in any possible geometrical shape, relative pitch, or angular slant relative to the environmental model. The position and/or coloring of each vertex in the mesh are then adjusted by the invention to convey the results of the predicted network performance.

Figure 11:
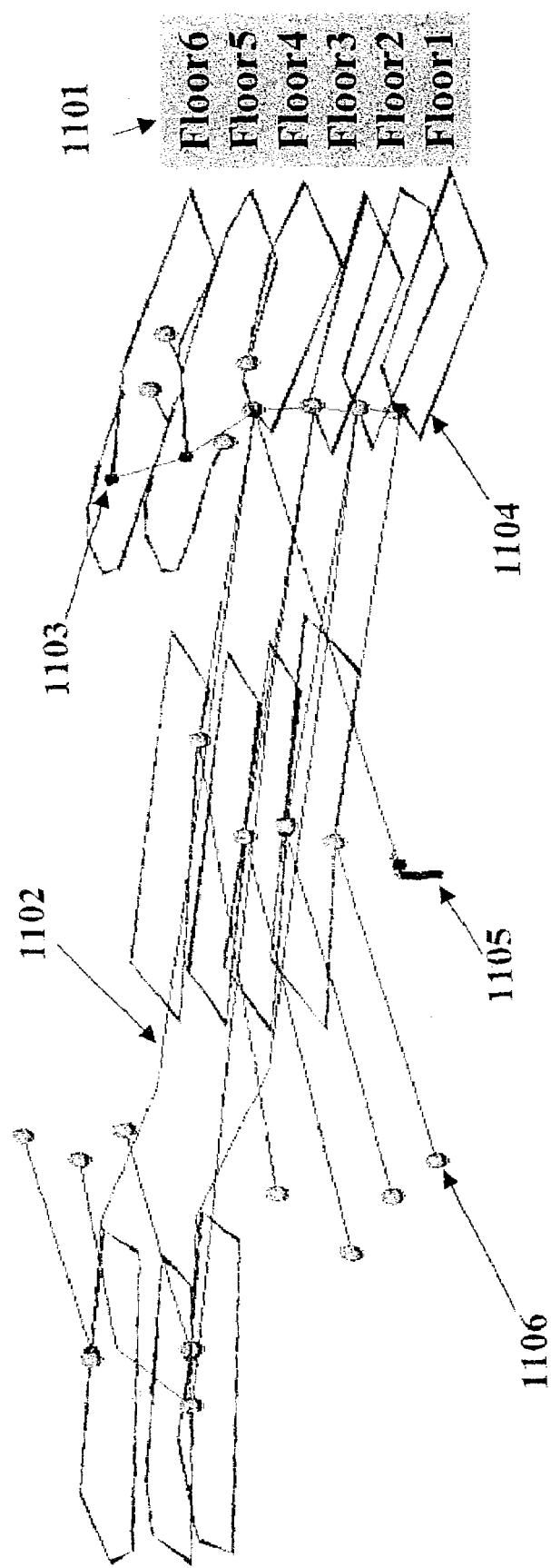
FIG. 11 shows an illustration of another example output according to the present invention.

Referring to FIG. 11, there is shown another example output of the invention. In FIG. 11, a structured cable network is displayed. The communication network diagramed in FIG. 11 consists of coaxial cable 1102, splitters 1103, radiating cable 1104, repeater or base station 1105, and antennas 1106. One skilled in the art could easily see how such a structured network could consist of any form of electrical, communication, or mechanical network, including but not limited to: power and electrical conduits and wiring, telephone wiring, air conditioning and heating conduits, ventilation systems, lighting systems, closed circuit television networks, Ethernet networks, alarm systems, or any other form of structured cable network. The preferred method for positioning such a structured cable network within the environmental model is given in U.S. Pat. No. 6,493,679 which is herein incorporated by reference.

The structured cable network shown in FIG. 11 has been positioned and configured within a six story building environment 1101, and all network components 1102-1106 comprising the structured cable network are positioned in three-dimensions at the appropriate scale and relative distance from one another within the model of the environment. However, in FIG. 11 the environment model itself has simply been hidden from view and made transparent, providing the user of the invention with a clear visualization of the physical layout of the structured cable network unobstructed by the model of the physical environment. The infrastructure wiring diagram of FIG. 11 may also be displayed in a highlighted fashion with the physical layout shown less prominently (e.g., as an outline, etc.). This would make the infrastructure wiring diagram appear as a "layer" in a CAD system. In the same way, predicted or measured data may be hidden from view. Alternatively, all such data may be turned on/off for viewing purposes. Thus, the physical obstructions modeled in the environment, including walls, doors, windows, ceilings, buildings, hills, foliage, etc, have been made transparent in FIG. 11, leaving only the structured cable network visible.

Although the environment modeled in FIG. 11 is a single multistory building, one skilled in the art could easily see how the computer model may represent any environment in the world, and how this visualization could be a valuable output for use in reports, archived documents, or use in or by other applications or software programs.

An important feature of the output shown in FIG. 11, is that a communications engineer or system designer is provided with a representation of all of the equipment accurately spatially positioned relative to all other equipment in the communication system. Thus, the invention provides a simplified and accurate means by which the engineer can construct a spatially positioned model of the communications system. In particular, he or she would construct the representation of the communications system by conveniently using the displayed database model of the physical environment, and then be able to eliminate or reduce in prominence elements of the physical environment. This method for preparing a spatially positioned infrastructure wiring diagram can be used with both 2-D and 3-D displays.

The current invention also allows a complete bill of materials of the shown network infrastructure to be instantly viewed, displayed, edited, or stored. In addition, maintenance records, physical cost, and installation cost for all components shown in FIG. 11 are integrated with the invention and may be viewed, displayed, edited, or stored. Note that in FIG. 11 that the floor number is clearly shown or may be annotated on the display. Also, the data and network configuration and component interconnections represented in FIG. 11 may be downloaded or transported to other commercially available visualization software such as Microsoft PowerPoint or Visio, Autodesk AutoCAD or AutoCAD Lite, or other drawing, diagramming, or viewing software application know now or in the future. Furthermore, the maintenance, costs, performance, and engineering data of the network, such as is shown in FIG. 11, may be similarly exported to other applications or portable viewers or transferred through any form of communication protocol or electronic means.

Figure 12:
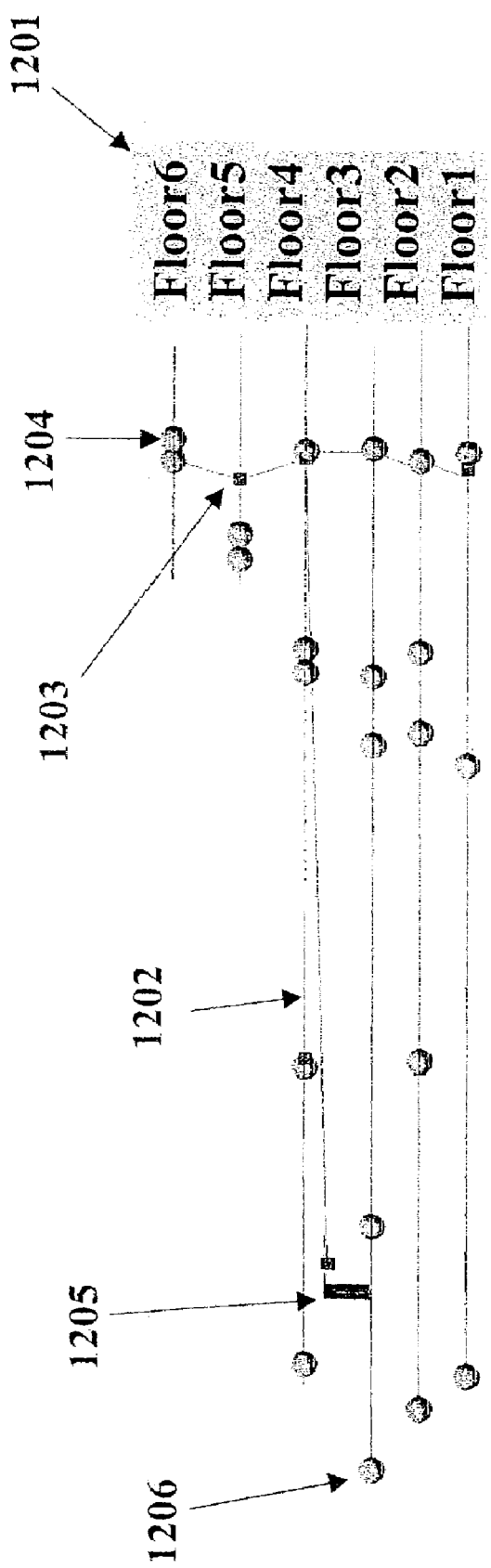
FIG. 12 shows an illustration of the cable network of FIG. 11 from a side angle.

The structured cable network displayed in FIG. 11 may be displayed from any angle and orientation by the invention. Referring to FIG. 12, there is shown the same structured cable network as shown in FIG. 11 but viewed from the side angle. Thus, the view of the structured cable network may be either 2-D or 3-D. The same multistory building environment 1201 is represented, and the same structured cable network consisting of coaxial cable 1202, splitters 1203, radiating cable 1204, repeater or base station 1205, and antennas 1206 is represented. The view of said structured cable network has simply been altered by the invention in FIG. 12 to display a perspective of the structure cable network from a different angle. Note that the perspective may be chosen to show either 2-D or 3-D.

This invention may be implemented on a single computer or a network of computers involving client and server interaction between computers. Furthermore, this invention may be implemented on handheld or portable computing devices, and may be used with mobile or embedded measurement or sensing devices. In addition, it should be clear that this invention may be used to compare and contrast measurements, predictions, and simulation results, as well as the differences between measured and predicted metrics, or the differences between desired and actual results, whether predicted or measured. These differences may be expressed in absolute or relative terms. It should also be clear that the invention may be implemented, viewed, displayed, or used using a remote client-server application, an application service provider model, or on or over the world wide web or Internet.

While the invention has been described in terms of its preferred embodiments, those skilled in the art will recognize that the invention can be practiced with modification within the spirit and scope of the appended claims. For example, this invention may not be limited just to wired or wireless communication systems, but may be used to present any type of electromagnetic characteristics superimposed on any simulated three-dimensional environment. For example, the invention would find application in the next generation field of micromachines, sensors, and ultrawide band modems, nanomachines, sensors and ultrawide band modems, or micro-electrical-mechanical machines (MEMS). These machines are extremely small yet highly sophisticated functional elements that allow them to perform complicated tasks in hard-to-access locations, such as inside the human body, in plumbing, in jet engines, etc. It will be necessary to both wirelessly communicate with these machines as well as wirelessly provide power for these machines, such as in the form of RF pulses, infrared (IR) light or any other form of electromagnetic medium.

The present invention would therefore facilitate the modeling and presentation of this or any other wireless electromagnetic system.

Having thus described our invention, what we claim as new and desire to secure by letters patent is as follows:

1. A system for modeling a network which includes or will include one or more components with electromagnetic characteristics, comprising: a computer database model of a site where a network may be deployed that includes or will include one or more components with electromagnetic characteristics; a display for displaying a site map of said site; means for selecting computer representations of one or more components which may be used in said network from amongst a database of computer representations of components, said computer representations of each of said one or more components including performance data; means for positioning said one or more components on said site map of said site; means for calculating or measuring at least two different performance characteristics for said network modeled by said computer database model; and means for displaying, on said site map of said site, a graphical rendering of said at least two different performance characteristics.

2. The system of claim 1 wherein said graphical rendering includes variations in color pertaining to a first of said at least two different performance characteristics, and a mesh of fluctuating elevations pertaining to a second of said at least two different performance characteristics.

3. The system of claim 1 wherein at least one of said one or more components are wireless communication components.

4. The system of claim 3 wherein said wireless communication components are selected from the group consisting of base stations, base station controllers, amplifiers, attenuators, antennas, coaxial cabling, fiber optic cabling, splitters, repeaters, transducers, converters, couplers, leaky feeder cables, hubs, switches, routers, firewalls, MIMO systems, sensors, power distribution lines, wiring, twisted pair cabling and wireless or other access points.

5. The system of claim 1 wherein at least one of said one or more components is selected from the group consisting of micro machines and micro electrical mechanical machines.

6. The system of claim 1 wherein said performance characteristics are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, metrics, round trip time, signal level, interference level, quality of service, bandwidth delay product, handoff delay time, signal loss, data loss, number of users serviced, user density, locations of adequate coverage, handoff locations, locations of adequate throughput, $E_c I_o$, system performance parameters, equipment price, maintenance and cost information, all in either absolute or relative terms.

7. The system of claim 1 wherein said site map is two dimensional.

8. The system of claim 1 wherein said site map is three dimensional.

9. The system of claim 1 wherein said means for selecting permits changing at least one of said one or more components which may be used in said network, and wherein said means for calculating or measuring and said means for displaying reflect changes made with said means for selecting.

10. The system of claim 9 wherein said means for calculating or measuring and said means for displaying reflect changes in real time or near real time.

11. The system of claim 1 wherein said site map provides representations of physical objects which may be used in said site.

12. The system of claim 11 wherein said physical objects are assigned physical, electrical, or aesthetic values which are considered in calculations or measurements performed by said means for calculating or measuring.

13. The system of claim 12 wherein said physical, electrical or aesthetic values include at least one of height, attenuation or RF penetration loss, surface roughness, reflectivity, and color.

14. The system of claim 11 wherein said physical objects include at least one of door, wall, ceiling, buildings, window, tree, person, furniture, hill, and climactic condition.

15. The system of claim 1 wherein said site map presents one of a part of a building, a building, a collection of buildings, terrain, and foliage.

16. The system of claim 1 wherein said network is a communications network.

17. The system of claim 16 wherein said components in said communications network include wireless communication components.

18. The system of claim 1 further comprising a means for selecting a viewing angle displayed by said means for displaying.

19. The system of claim 18 wherein said means for selecting a viewing angle allows for re-orienting the viewing angle a plurality of times.

20. The system of claim 1 wherein said means for displaying adjusts one of elevation and coloring based on values for a performance characteristic of said at least two different performance characteristics.

21. The system of claim 20 wherein said means for displaying adjusts elevation for a first performance characteristic and adjusts coloring for a second performance characteristic.

22. The system of claim 20 wherein said means for displaying adjusts at least one of saturation, hue, brightness, line type, line width, transparency and surface texture.

23. The system of claim 22 further comprising means for saving the site specific infrastructure wiring diagram in a computer readable format.

24. The system of claim 22 further comprising means for transferring or exporting the site specific infrastructure wiring diagram to an application program.

25. The system of claim 1 wherein said means for calculating or measuring performs measurements.

26. The system of claim 25 further comprising a means for inputting measurements taken from said site into said computer database model.

27. A method for modeling a network which includes or will include one or more components with electromagnetic characteristics, comprising: providing a computer database model of a site where a network may be deployed that includes or will include one or more components with electromagnetic characteristics; displaying a site map of said site; selecting computer representations of one or more components which may be used in said network from amongst a database of computer representations of components, said computer representations of each of said one or more components including performance data; positioning said one or more components on said site map of said site; calculating or measuring at least two different performance characteristics of said communications network modeled by said computer database model; and displaying, on said site map of said site, a graphical rendering of said at least two different performance characteristics.

28. The method of claim 27 wherein said graphical rendering displayed in said displaying step includes variations in color pertaining to a first of said at least two different performance characteristics, and a mesh of fluctuating elevations pertaining to a second of said at least two different performance characteristics.

29. The method of claim 27 wherein at least one of said one or more components are wireless communication components.

30. The method of claim 29 wherein said wireless communication components are selected from the group consisting of base stations, base station controllers, amplifiers, attenuators, antennas, coaxial cabling, fiber optic cabling, splitters, repeaters, transducers, converters, couplers, leaky feeder cables, hubs, switches, routers, MIMO systems, sensors, firewalls, power distribution lines, wiring, twisted pair cabling and wireless or other access points.

31. The method of claim 27 wherein at least one of said one or more components is selected from the group consisting of micro machines and micro electrical mechanical machines.

32. The method of claim 27 wherein said performance characteristics calculated in said calculating step are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, metrics, round trip time, signal level, interference level, quality of service, bandwidth delay product, handoff delay time, signal loss, data loss, number of users serviced, user density, locations of adequate coverage, handoff locations, locations of adequate throughput, $E_c I_o$, system performance parameters, equipment price, maintenance and cost information, all in either absolute or relative terms.

33. The method of claim 27 wherein said site map is two dimensional.

34. The method of claim 27 wherein said site map is three dimensional.

35. The method of claim 27 further comprising the steps of changing at least one of said one or more components which may be used in said network, and said calculating or measuring and said displaying steps are performed in a manner where said at least two different performance characteristics reflect changes made in said changing step.

36. The method of claim 35 wherein said calculating or measuring and said displaying steps reflect changes in real time or near real time.

37. The method of claim 27 wherein said site map provides representations of physical objects which may be used in said site.

38. The method of claim 37 wherein said physical objects are assigned physical, electrical, or aesthetic values which are considered in calculations or measurements performed in said calculating or measuring step.

39. The method of claim 38 wherein said physical, electrical or aesthetic values include at least one of height, attenuation or RF penetration loss, surface roughness, reflectivity, and color.

40. The method of claim 37 wherein said physical objects include at least one of door, wall, ceilings, buildings, window, tree, person, furniture, hill, and climactic condition.

41. The method of claim 27 wherein said site map presents one of a part of a building, a building, a collection of buildings, terrain, and foliage.

42. The method of claim 27 wherein said network is a communications network.

43. The method of claim 42 wherein said components in said communications network include wireless communication components.

44. The method of claim 27 further comprising the step of selecting a viewing angle displayed by said means for displaying.

45. The method of claim 44 further comprising the step of re-orienting the viewing angle a plurality of times.

46. The method of claim 27 wherein said displaying step adjusts one of elevation and coloring based on values for a performance characteristic of said at least two different performance characteristics.

47. The method of claim 46 wherein said displaying step adjusts elevation for a first performance characteristic and adjusts coloring for a second performance characteristic.

48. The method of claim 46 wherein said displaying step adjusts at least one of saturation, hue, brightness, line type, line width, transparency, and surface texture.

49. The method of claim 27 wherein calculations are performed during said calculating or measuring step.

50. The method of claim 27 wherein measurements are performed during said calculating or measuring step.

51. The method of claim 50 further comprising the step of inputting measurements taken from said site into said computer database model.

52. A method for modeling a network which includes or will include one or more components with electromagnetic characteristics, comprising the steps of: providing a computer database model of a site where a network may be deployed that includes or will include one or more components with electromagnetic characteristics; displaying a site map of said site; selecting computer representations of one or more components which may be used in said network from amongst a database of computer representations of components, said computer representations of each of said one or more components including performance data; positioning said one or more components on said site map of said site; providing a selectively controlled number of vertices on said site map; calculating or measuring one or more performance characteristics of said communications network modeled by said computer database model at each of said vertices on said site map; and displaying, on said site map of said site, one or more performance characteristics using said vertices.

53. The method of claim 52 wherein said step of providing a selectively controlled number of vertices includes the step of increasing the number of vertices.

54. The method of claim 52 wherein said step of providing a selectively controlled number of vertices includes the step of decreasing the number of vertices.

55. The method of claim 52 wherein said step of providing a selectively controlled number of vertices provides a wire mesh appearance.

56. The method of claim 52 wherein said displaying step displays a graphical rendering of said one or more performance characteristics.

57. The method of claim 56 wherein said calculating or measuring step calculates or measures at least two different performance characteristics for said network and said displaying step displays a graphical rending of said at least two different performance characteristics.

58. The method of claim 57 wherein said graphical rendering includes variations in color pertaining to a first of said at least two different performance characteristics, and a mesh of fluctuating elevations pertaining to a second of said at least two different performance characteristics.

59. The method of claim 52 wherein at least one of said one or more components are wireless communication components.

60. The method of claim 52 wherein said wireless communication components are selected from the group consisting of base stations, base station controllers, amplifiers, attenuators, antennas, coaxial cabling, fiber optic cabling, splitters, repeaters, transducers, converters, couplers, leaky feeder cables, hubs, switches, MIMO systems, sensors, routers, firewalls, power distribution lines, wiring, twisted pair cabling and wireless or other access points.

61. The method of claim 52 wherein at least one of said one or more components is selected from the group consisting of micro machines and micro electrical mechanical machines.

62. The method of claim 52 wherein said performance characteristics are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, $E_C I_O$, system performance parameters, equipment price, maintenance and cost information, all in either absolute or relative terms.

63. The method of claim 52 wherein said site map is two dimensional.

64. The method of claim 52 wherein said site map is three dimensional.

65. The method of claim 52 further comprising the step of changing at least one of said one or more components which may be used in said network, and wherein said calculating or measuring and said displaying steps reflect changes made in said changing step.

66. The method of claim 65 wherein said calculating or measuring and said displaying steps reflect changes in real time or near real time.

67. The method of claim 52 wherein said site map provides representations of physical objects which may be used in said site.

68. The method of claim 67 wherein said physical objects are assigned physical, electrical, or aesthetic values which are considered in calculations performed by said means for calculating or measuring.

69. The method of claim 68 wherein said physical, electrical or aesthetic values include at least one of height, attenuation or RF penetration loss, surface roughness, reflectivity, and color.

70. The method of claim 67 wherein said physical objects include at least one of door, wall, ceilings, buildings, window, tree, person, furniture, hill, and climactic condition.

71. The method of claim 52 wherein said site map presents one of a part of a building, a building, a collection of buildings, terrain, and foliage.

72. The method of claim 52 wherein said network is a communications network.

73. The method of claim 72 wherein said components in said communications network include wireless communication components.

74. The method of claim 52 further comprising the step of selecting a viewing angle to be implemented in said displaying step.

75. The method of claim 74 further comprising the step of re-orienting the viewing angle a plurality of times.

76. The method of claim 52 wherein calculations are performed during said calculating or measuring step.

77. The method of claim 52 wherein measurements are performed during said calculating or measuring step.

78. The method of claim 77 further comprising the step of inputting measurements taken from said site into said computer database model.

79. A system for modeling a network which includes or will include one or more components with electromagnetic characteristics, comprising: a computer database model of a site where a network may be deployed that includes or will include one or more components with electromagnetic characteristics; a display for displaying a three dimensional site map of said site; means for selecting computer representations of one or more components which may be used in said network from amongst a database of computer representations of components, said computer representations of each of said one or more components including performance data; means for positioning said one or more components on said site map of said site; means for providing a selectively controlled number of vertices on said three-dimensional site map; means for calculating or measuring one or more performance characteristics of said network modeled by said computer database model at each of said vertices on said site map; and means for displaying, on said site map of said site, said one or more performance characteristics using said vertices.

80. The system of claim 79 wherein said means for providing a selectively controlled number of vertices includes a means for increasing the number of vertices.

81. The system of claim 79 wherein said means for providing a selectively controlled number of vertices includes a means for decreasing the number of vertices.

82. The system of claim 79 wherein said means for providing a selectively controlled number of vertices provides a wire mesh appearance.

83. The system of claim 79 wherein said means for displaying displays a graphical rendering of said one or more performance characteristics.

84. The system of claim 83 wherein said means for calculating calculates at least two different performance characteristics for said network and said means for displaying displays a graphical rending of said at least two different performance characteristics.

85. The system of claim 84 wherein said graphical rendering includes variations in color pertaining to a first of said at least two different performance characteristics, and a mesh of fluctuating elevations pertaining to a second of said at least two different performance characteristics.

86. The system of claim 79 wherein at least one of said one or more components are wireless communication components.

87. The system of claim 86 wherein said wireless communication components are selected from the group consisting of base stations, base station controllers, amplifiers, attenuators, antennas, coaxial cabling, fiber optic cabling, splitters, repeaters, transducers, converters, couplers, leaky feeder cables, hubs, switches, MIMO systems, sensors, routers, firewalls, power distribution lines, wiring, twisted pair cabling and wireless or other access points.

88. The system of claim 79 wherein at least one of said one or more components is selected from the group consisting of micro machines and micro electrical mechanical machines.

89. The system of claim 79 wherein said performance characteristics are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, $E_c I_o$, system performance parameters, equipment price, maintenance and cost information, all in either absolute or relative terms.

90. The system of claim 79 wherein said site map is two dimensional.

91. The system of claim 79 wherein said site map is three dimensional.

92. The system of claim 79 wherein said means for selecting permits changing at least one of said one or more components which may be used in said network, and wherein said means for calculating or measuring and said means for displaying reflect changes made with said means for selecting.

93. The system of claim 92 wherein said means for calculating or measuring and said means for displaying reflect changes in real time or near real time.

94. The system of claim 79 wherein said site map provides representations of physical objects which may be used in said site.

95. The system of claim 94 wherein said physical objects are assigned physical, electrical, or aesthetic values which are considered in calculations or measurements performed by said means for calculating or measuring.

96. The system of claim 95 wherein said physical, electrical or aesthetic values include at least one of height, attenuation or RF penetration loss, surface roughness, reflectivity, and color.

97. The system of claim 94 wherein said physical objects include at least one of door, wall, ceilings, buildings, window, tree, person, furniture, hill, and climactic condition.

98. The system of claim 79 wherein said site map presents one of a part of a building, a building, a collection of buildings, terrain, and foliage.

99. The system of claim 79 wherein said network is a communications network.

100. The system of claim 99 wherein said components in said communications network include wireless communication components.

101. The system of claim 79 further comprising a means for selecting a viewing angle displayed by said means for displaying.

102. The system of claim 101 wherein said means for selecting a viewing angle allows for re-orienting the viewing angle a plurality of times.

103. The system of claim 79 wherein said means for calculating or measuring performs calculations.

104. The system of claim 79 wherein said means for calculating or measuring performs measurements.

105. The system of claim 104 further comprising a means for inputting measurements taken from said site into said computer database model.

106. A system for modeling a network which includes or will include one or more components with electromagnetic characteristics, comprising: a computer database model of a site where a network may be deployed which includes ore will include one or more components with electromagnetic characteristics; a display for displaying a three-dimensional site map of said site; means for selecting computer representations of one or more components which may be used in said network from amongst a database of computer representations of components, said computer representations of each of said one or more components including performance data; means for positioning said one or more components on said three-dimensional site map of said site; means for calculating or measuring one or more performance characteristics of said network modeled by said computer database model; and means for displaying a fence grid which encircles said three-dimensional site map of said site; and means for displaying on said fence grid, a graphical rendering of said one or more performance characteristics.

107. The system of claim 106 wherein at least one of said one or more components are wireless communication components.

108. The system of claim 107 wherein said wireless communication components are selected from the group consisting of base stations, base station controllers, amplifiers, attenuators, antennas, coaxial cabling, fiber optic cabling, splitters, repeaters, transducers, converters, couplers, leaky feeder cables, hubs, switches, routers, MIMO systems, sensors, firewalls, power distribution lines, wiring, twisted pair cabling and wireless access points.

109. The system of claim 106 wherein at least one of said one or more components is selected from the group consisting of micro machines and micro electrical mechanical machines.

110. The system of claim 106 wherein said performance characteristics are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, $E_cI_o$, system performance parameters, equipment price, maintenance and cost information, all in either absolute or relative terms.

111. The system of claim 106 wherein said fence grid is two dimensional.

112. The system of claim 106 wherein said fence grid is three dimensional.

113. The system of claim 106 wherein said means for selecting permits changing at least one of said one or more components which may be used in said network, and wherein said means for calculating or measuring and said means for displaying reflect changes made with said means for selecting.

114. The system of claim 113 wherein said means for calculating or measuring and said means for displaying reflect changes in real time or near real time.

115. The system of claim 106 wherein said site map provides representations of physical objects which may be used in said site.

116. The system of claim 115 wherein said physical objects are assigned physical, electrical, or aesthetic values which are considered in calculations or measurements performed by said means for calculating or measuring.

117. The system of claim 116 wherein said physical, electrical or aesthetic values include at least one of height, attenuation or RF penetration loss, surface roughness, reflectivity, and color.

118. The system of claim 115 wherein said physical objects include at least one of door, wall, ceiling, buildings, window, tree, person, furniture, hill, and climactic condition.

119. The system of claim 106 wherein said site map presents one of a part of a building, a building, a collection of buildings, terrain, and foliage.

120. The system of claim 106 wherein said network is a communications network.

121. The system of claim 120 wherein said components in said communications network include wireless communication components.

122. The system of claim 106 further comprising a means for selecting a viewing angle displayed by said means for displaying.

123. The system of claim 122 wherein said means for selecting a viewing angle allows for re-orienting the viewing angle a plurality of times.

124. The system of claim 106 wherein said means for displaying adjusts one of elevation and coloring based on values for a performance characteristic calculated or measured by said means for calculating or measuring.

125. The system of claim 124 wherein said means for displaying adjusts at least one of saturation, hue, brightness, line type, line width, transparency, and surface texture.

126. The system of claim 106 wherein said means for calculating or measuring performs calculations.

127. The system of claim 106 wherein said means for calculating or measuring performs measurements.

128. The system of claim 127 further comprising a means for inputting measurements taken from said site into said computer database model.

129. A method for modeling a network which includes or will include one or more components with electromagnetic properties, comprising: providing a computer database model of a site where a network may be deployed which includes or will include one or more components with electromagnetic characteristics; displaying a three-dimensional site map of said site; selecting computer representations of one or more components which may be used in said network from amongst a database of computer representations of components, said computer representations of each of said one or more components including performance data; positioning said one or more components on said three-dimensional site map of said site; calculating one or more performance characteristics of said network modeled by said computer database model; and displaying a fence grid which encircles said three-dimensional site map of said site; and displaying on said fence grid, a graphical rendering of said one or more performance characteristics.

130. The method of claim 129 wherein at least one of said one or more components are wireless communication components.

131. The method of claim 130 wherein said wireless communication components are selected from the group consisting of base stations, base station controllers, amplifiers, attenuators, antennas, coaxial cabling, fiber optic cabling, splitters, repeaters, transducers, converters, couplers, leaky feeder cables, hubs, switches, routers, MIMO systems, sensors, firewalls, power distribution lines, wiring, twisted pair cabling and wireless access points.

132. The method of claim 129 wherein at least one of said one or more components is selected from the group consisting of micro machines and micro electrical mechanical machines.

133. The method of claim 129 wherein said performance characteristics are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, $E_c I_o$, system performance parameters, equipment price, maintenance and cost information, all in either absolute or relative terms.

134. The method of claim 129 wherein said fence grid is two dimensional.

135. The method of claim 129 wherein said fence grid is three dimensional.

136. The method of claim 129 further comprising the step of changing at least one of said one or more components which may be used in said network, and wherein said calculating or measuring and said displaying steps reflect changes made in said changing step.

137. The method of claim 136 wherein said calculating or measuring and said displaying reflect changes made in said changing step in real time or near real time.

138. The method of claim 129 wherein said site map provides representations of physical objects which may be used in said site.

139. The method of claim 138 wherein said physical objects are assigned physical, electrical, or aesthetic values which are considered in calculations or measurements performed by said means for calculating or measuring.

140. The method of claim 139 wherein said physical, electrical or aesthetic values include at least one of height, attenuation or RF penetration loss, surface roughness, reflectivity, and color.

141. The method of claim 138 wherein said physical objects include at least one of door, wall, ceiling, buildings, window, tree, person, furniture, hill, and climactic condition.

142. The method of claim 129 wherein said site map presents one of a part of a building, a building, a collection of buildings, terrain, and foliage.

143. The method of claim 129 wherein said network is a communications network.

144. The method of claim 143 wherein said components in said communications network include wireless communication components.

145. The method of claim 129 further comprising the step of selecting a viewing angle displayed by said means for displaying.

146. The method of claim 145 further comprising the step of re-orienting the viewing angle a plurality of times.

147. The method of claim 129 further comprising the step of adjusting one of elevation and coloring based on values for a performance characteristic calculated or measured in said calculating or measuring step.

148. The method of claim 147 wherein said means for displaying adjusts at least one of saturation, hue, brightness, line type, line width, transparency, and surface texture.

149. The method of claim 129 wherein calculations are performed during said calculating or measuring step.

150. The method of claim 129 wherein measurements are performed during said calculating or measuring step.

151. The method of claim 150 further comprising the step of inputting measurements taken from said site into said computer database model.

152. A system for modeling a network which includes or will include one or more components with electromagnetic properties, comprising: a computer database model of a site where a network may be deployed which includes or will include one or more components with electromagnetic characteristics; a display for displaying a site map of said site; means for selecting computer representations of one or more components which may be used in said network from amongst a database of computer representations of components, said computer representations of each of said one or more components including performance data; means for positioning said one or more components on said site map of said site; means for calculating or measuring one or more performance characteristics of said network modeled by said computer database model; and means for displaying from at least two different perspectives of said site map of said site, a graphical rendering of said one or more performance characteristics.

153. The system of claim 152 wherein said means for displaying allows for establishing or adjusting a viewing angle from 0° to 90° with respect to a z-axis passing through said site map.

154. The system of claim 153 wherein said wireless communication components are selected from the group consisting of base stations, base station controllers, amplifiers, attenuators, antennas, coaxial cabling, fiber optic cabling, splitters, repeaters, transducers, converters, couplers, leaky feeder cables, hubs, switches, routers, MIMO systems, sensors, firewalls, power distribution lines, wiring, twisted pair cabling and wireless or other access points.

155. The system of claim 152 wherein said means for displaying allows for rotating a perspective view of said site map from 0° to 360° about a z-axis passing through said site map.

156. The system of claim 152 wherein at least one of said one or more components are wireless communication components.

157. The system of claim 152 wherein at least one of said one or more components is selected from the group consisting of micro machines and micro electrical mechanical machines.

158. The system of claim 152 wherein said performance characteristics are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, $E_cI_o$, system performance parameters, equipment price, maintenance and cost information, all in either absolute or relative terms.

159. The system of claim 152 wherein said site map is two dimensional.

160. The system of claim 152 wherein said site map is three dimensional.

161. The system of claim 152 wherein said means for selecting permits changing at least one of said one or more components which may be used in said network, and wherein said means for calculating or measuring and said means for displaying reflect changes made with said means for selecting.

162. The system of claim 161 wherein said means for calculating or measuring and said means for displaying reflect changes in real time or near real time.

163. The system of claim 152 wherein said site map provides representations of physical objects which may be used in said site.

164. The system of claim 163 wherein said physical objects are assigned physical, electrical, or aesthetic values which are considered in calculations or measurements performed by said means for calculating or measuring.

165. The system of claim 164 wherein said physical, electrical or aesthetic values include at least one of height, attenuation or RF penetration loss, surface roughness, reflectivity, and color.

166. The system of claim 163 wherein said physical objects include at least one of door, wall, ceiling, buildings, window, tree, person, furniture, hill, and climactic condition.

167. The system of claim 152 wherein said site map presents one of a part of a building, a building, a collection of buildings, terrain, and foliage.

168. The system of claim 152 wherein said network is a communications network.

169. The system of claim 168 wherein said components in said communications network include wireless communication components.

170. The system of claim 152 further comprising a means for selecting a viewing angle displayed by said means for displaying.

171. The system of claim 170 wherein said means for selecting a viewing angle allows for re-orienting the viewing angle a plurality of times.

172. The system of claim 152 wherein said means for displaying adjusts one of elevation and coloring based on values for a performance characteristic.

173. The system of claim 172 wherein said means for displaying adjusts at least one of saturation, hue, brightness, line type, line width, transparency, and surface texture.

174. The system of claim 152 wherein said means for calculating or measuring performs calculations.

175. The system of claim 152 wherein said means for calculating or measuring performs measurements.

176. The system of claim 175 further comprising a means for inputting measurements taken from said site into said computer database model.

177. A method for modeling a network which includes or will include one or more components with electromagnetic characteristics, comprising: providing a computer database model of a site where a network may be deployed which includes or will include one or more components with electromagnetic characteristics; displaying a site map of said site; selecting computer representations of one or more components which may be used in said network from amongst a database of computer representations of components, said computer representations of each of said one or more components including performance data; positioning said one or more components on said site map of said site; calculating or measuring one or more performance characteristics of said network modeled by said computer database model; and displaying, from amongst a plurality of different perspectives of said site map of said site, a graphical rendering of said one or more performance characteristics.

178. The method of claim 177 further comprising the step of establishing or adjusting a viewing angle from 0° to 90° with respect to a z-axis passing through said site map.

179. The method of claim 177 further comprising the step of rotating a perspective view of said site map from 0° to 360° about a z-axis passing through said site map.

180. The method of claim 177 wherein at least one of said one or more components are wireless communication components.

181. The method of claim 180 wherein said wireless communication components are selected from the group consisting of base stations, base station controllers, amplifiers, attenuators, antennas, coaxial cabling, fiber optic cabling, splitters, repeaters, transducers, converters, couplers, leaky feeder cables, hubs, switches, routers, MIMO systems, sensors, firewalls, power distribution lines, wiring, twisted pair cabling and wireless or other access points.

182. The method of claim 177 wherein at least one of said one or more components is selected from the group consisting of micro machines and micro electrical mechanical machines.

183. The method of claim 177 wherein said performance characteristics are selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, $E_cI_o$, system performance parameters, equipment price, maintenance and cost information, all in either absolute or relative terms.

184. The method of claim 177 wherein said site map is two dimensional.

185. The method of claim 177 wherein said site map is three dimensional.

186. The method of claim 177 further comprising the step of changing at least one of said one or more components which may be used in said network, and wherein said calculating or measuring and said displaying steps reflect changes made in said changing step.

187. The method of claim 186 wherein said means for calculating or measuring and said means for displaying reflect changes in real time or near real time.

188. The method of claim 177 wherein said site map provides representations of physical objects which may be used in said site.

189. The method of claim 188 wherein said physical objects are assigned physical, electrical, or aesthetic values which are considered in calculations or measurements performed by said means for calculating or measuring.

190. The method of claim 189 wherein said physical, electrical or aesthetic values include at least one of height, attenuation or RF penetration loss, surface roughness, reflectivity, and color.

191. The method of claim 188 wherein said physical objects include at least one of door, wall, ceiling, buildings, window, tree, person, furniture, hill, and climactic condition.

192. The method of claim 177 wherein said site map presents one of a part of a building, a building, a collection of buildings, terrain, and foliage.

193. The method of claim 177 wherein said network is a communications network.

194. The method of claim 193 wherein said components in said communications network include wireless communication components.

195. The method of claim 177 further comprising the step of selecting a viewing angle displayed in said displaying step.

196. The method of claim 195 further comprising the step of re-orienting the viewing angle a plurality of times.

197. The method of claim 177 further comprising the step of adjusting one of elevation and coloring based on values for a performance characteristic.

198. The method of claim 197 wherein said adjusting step adjusts on the display at least one of saturation, hue, brightness, line type, line width, transparency, and surface texture.

199. The method of claim 177 wherein calculations are performed during said calculating or measuring step.

200. The method of claim 177 wherein measurements are performed during said calculating or measuring step.

201. The method of claim 200 further comprising the step of inputting measurements taken from said site into said computer database model.

202. A system for generating, viewing or exporting a spatially positioned infrastructure wiring diagram of a network which includes or will include one or more components with electromagnetic characteristics, comprising: a computer database model of a site where a network may be deployed that includes or will include one or more components with electromagnetic characteristics; a display for displaying a site map of said site; means for selecting computer representations of one or more components which may be used in said network from amongst a database of computer representations of components, said computer representations of each of said one or more components including performance data; means for positioning said one or more components on said site map of said site; means for connecting two or more components together, said means for selecting, said means for positioning, and said means for connecting creating a site specific infrastructure wiring diagram; means for displaying said one or more components, spatially positioned relative to each other, with said site map being absent or reduced in prominence relative to said site specific infrastructure wiring diagram.

203. The system of claim 202 wherein said means for displaying allows for establishing or adjusting a viewing angle from 0° to 90° with respect to a z-axis passing through said site map.

204. The system of claim 202 wherein said means for displaying allows for rotating a perspective view of said site map from 0° to 360° about a z-axis passing through said site map.

205. The system of claim 202 wherein at least one of said one or more components are wireless communication components.

206. The system of claim 205 wherein said wireless communication components are selected from the group consisting of base stations, base station controllers, amplifiers, attenuators, antennas, coaxial cabling, fiber optic cabling, splitters, repeaters, transducers, converters, couplers, leaky feeder cables, hubs, switches, routers, MIMO systems, sensors, firewalls, power distribution lines, wiring, twisted pair cabling and wireless or other access points.

207. The system of claim 202 wherein at least one of said one or more components is selected from the group consisting of micro machines and micro electrical mechanical machines.

208. The system of claim 202 further comprising a means for calculating or measuring at least one performance characteristic for said network modeled by said computer database model.

209. The system of claim 208 wherein said performance characteristic is selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, $E_cI_o$, system performance parameters, equipment price, maintenance and cost information, all in either absolute or relative terms.

210. The system of claim 208 wherein said means for selecting permits changing at least one of said one or more components which may be used in said network, and wherein said means for calculating or measuring and said means for displaying reflect changes made with said means for selecting.

211. The system of claim 210 wherein said means for calculating or measuring and said means for displaying reflect changes in real time or near real time.

212. The system of claim 208 wherein said means for calculating or measuring performs calculations.

213. The system of claim 208 wherein said means for calculating or measuring performs measurements.

214. The system of claim 213 further comprising a means for inputting measurements taken from said site into said computer database model.

215. The system of claim 202 wherein said site map is two dimensional.

216. The system of claim 202 wherein said site map is three dimensional.

217. The system of claim 208 wherein said site map provides representations of physical objects which may be used in said site.

218. The system of claim 217 wherein said physical objects are assigned physical, electrical, or aesthetic values which are considered in calculations or measurements performed by said means for calculating or measuring.

219. The system of claim 218 wherein said physical, electrical or aesthetic values include at least one of height, attenuation or RF penetration loss, surface roughness, reflectivity, and color.

220. The system of claim 217 wherein said physical objects include at least one of door, wall, ceiling, buildings, window, tree, person, furniture, hill, and climactic condition.

221. The system of claim 202 wherein said site map presents one of a part of a building, a building, a collection of buildings, terrain, and foliage.

222. The system of claim 202 wherein said network is a communications network.

223. The system of claim 222 wherein said components in said communications network include wireless communication components.

224. The system of claim 202 further comprising a means for selecting a viewing angle displayed by said means for displaying.

225. The system of claim 224 wherein said means for selecting a viewing angle allows for re-orienting the viewing angle a plurality of times.

226. The system of claim 202 wherein said means for displaying adjusts one of elevation and coloring based on values for a performance characteristic.

227. The system of claim 226 wherein said means for displaying adjusts at least one of saturation, hue, brightness, line type, line width, transparency, and surface texture.

228. The system of claim 202 wherein said means for displaying said one or more components spatially positioned relative to each other displays said components with said site map absent.

229. The system of claim 202 wherein said means for displaying said one or more components spatially positioned relative to each other displays said components with said site map reduced in prominence relative to said site specific infrastructure wiring diagram.

230. A method for generating, viewing or exporting a spatially positioned infrastructure wiring diagram of a network which includes or will include one or more components with electromagnetic characteristics, comprising the steps of: providing a computer database model of a site where a network may be deployed that includes or will include one or more components with electromagnetic characteristics; displaying a site map of said site; selecting computer representations of one or more components which may be used in said network from amongst a database of computer representations of components, said computer representations of each of said one or more components including performance data; positioning said one or more components on said site map of said site; connecting two or more components together, said steps of selecting, positioning and connecting creating a site specific infrastructure wiring diagram; displaying said one or more components, spatially positioned relative to each other, with said site map being absent or reduced in prominence relative to said site specific infrastructure wiring diagram.

231. The method of claim 230 further comprising the step of saving the site specific infrastructure wiring diagram in a computer readable format.

232. The method of claim 230 further comprising the step of exporting or transferring the site specific infrastructure wiring diagram to an application program.

233. The method of claim 230 further comprising the step of establishing or adjusting a viewing angle from 0° to 90° with respect to a z-axis passing through said site map.

234. The method of claim 230 further comprising the step of rotating a perspective view of said site map from 0° to 360° about a z-axis passing through said site map.

235. The method of claim 230 wherein at least one of said one or more components are wireless communication components.

236. The method of claim 230 wherein said wireless communication components are selected from the group consisting of base stations, base station controllers, amplifiers, attenuators, antennas, coaxial cabling, fiber optic cabling, splitters, repeaters, transducers, converters, couplers, leaky feeder cables, hubs, switches, routers, MIMO systems, sensors, firewalls, power distribution lines, wiring, twisted pair cabling and wireless or other access points.

237. The method of claim 230 wherein at least one of said one or more components is selected from the group consisting of micro machines and micro electrical mechanical machines.

238. The method of claim 230 further comprising the step of calculating or measuring at least one performance characteristic for said network modeled by said computer database model.

239. The method of claim 238 wherein said performance characteristic is selected from the group consisting of radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, $E_cI_o$, system performance parameters, equipment price, maintenance and cost information, all in either absolute or relative terms.

240. The method of claim 238 further comprising the step of changing at least one of said one or more components which may be used in said network, and wherein said step of calculating or measuring and said step of displaying reflect changes made in said changing step.

241. The method of claim 240 wherein said calculating or measuring and said displaying steps reflect changes in real time or near real time.

242. The method of claim 238 wherein said site map provides representations of physical objects which may be used in said site.

243. The method of claim 242 wherein said physical objects are assigned physical, electrical, or aesthetic values which are considered in calculations or measurements performed in said calculating or measuring step.

244. The method of claim 243 wherein said physical, electrical or aesthetic values include at least one of height, attenuation or RF penetration loss, surface roughness, reflectivity, and color.

245. The method of claim 242 wherein said physical objects include at least one of door, wall, ceiling, buildings, window, tree, person, furniture, hill, and climactic condition.

246. The method of claim 238 wherein calculations are performed during said calculating or measuring step.

247. The method of claim 238 wherein measurements are performed during said calculating or measuring step.

248. The method of claim 247 further comprising the step of inputting measurements taken from said site into said computer database model.

249. The method of claim 230 wherein said site map is two dimensional.

250. The method of claim 230 wherein said site map is three dimensional.

251. The method of claim 230 wherein said site map presents one of a part of a building, a building, a collection of buildings, terrain, and foliage.

252. The method of claim 230 wherein said network is a communications network.

253. The method of claim 252 wherein said components in said communications network include wireless communication components.

254. The method of claim 230 further comprising the step of selecting a viewing angle displayed by said means for displaying.

255. The method of claim 230 further comprising the step of re-orienting the viewing angle a plurality of times.

256. The method of claim 230 further comprising the step of adjusting one of elevation and coloring based on values for a performance characteristic.

257. The method of claim 256 wherein said adjusting step adjusts at least one of saturation, hue, brightness, line type, line width, transparency, and surface texture.

258. The system of claim 1 wherein said means for calculating or measuring performs calculations.

* * * * *